United States Patent
Khare et al.

(10) Patent No.: US 12,549,946 B2
(45) Date of Patent: Feb. 10, 2026

(54) AUTHENTICATION PROXY FOR AKMA AUTHENTICATION SERVICE

(71) Applicant: Nokia Technologies Oy, Espoo (FI)

(72) Inventors: Saurabh Khare, Bangalore (IN); Suresh P Nair, Estero, FL (US); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 314 days.

(21) Appl. No.: 18/304,615

(22) Filed: Apr. 21, 2023

(65) Prior Publication Data

US 2023/0345246 A1    Oct. 26, 2023

(30) Foreign Application Priority Data

Apr. 26, 2022 (IN) .............. 202241024385

(51) Int. Cl.
*G06F 21/00* (2013.01)
*H04L 9/40* (2022.01)
(Continued)

(52) U.S. Cl.
CPC ....... *H04W 12/069* (2021.01); *H04L 63/0884* (2013.01); *H04W 12/041* (2021.01); *H04W 12/0433* (2021.01)

(58) Field of Classification Search
CPC ............ H04W 12/069; H04W 12/041; H04W 12/0433; H04W 12/06; H04W 12/0431; H04L 63/0884
See application file for complete search history.

(56) References Cited

U.S. PATENT DOCUMENTS

2023/0086032 A1\* 3/2023 Guo .................... H04W 12/065
  713/171
2023/0413045 A1\* 12/2023 Khare ............... H04W 12/0431
(Continued)

OTHER PUBLICATIONS

"3rd Generation Partnership Project; Technical Specification Group Services and System Aspects; Security architecture and procedures for 5G system (Release 17)", 3GPP TS 33.501, V17.5.0, Mar. 2022, pp. 1-293.

(Continued)

*Primary Examiner* — Kendall Dolly
(74) *Attorney, Agent, or Firm* — Ryan, Mason & Lewis, LLP

(57) ABSTRACT

Systems, methods, and software of performing an Authentication and Key Management for Applications (AKMA) authentication service. An AKMA authentication proxy resides between User Equipment (UE) and a plurality of Application Functions (AFs). The AKMA authentication proxy receive an application session establishment request message from the UE requesting an application session with a first application function, sends a key request message toward an AKMA anchor function (AAnF) requesting AKMA application keys for a plurality of application functions, receives a key response message sent from the AAnF that includes the AKMA application keys, identifies a first AKMA application key for the first application function from the AKMA application keys derived by the AAnF, and forwards the application session establishment request message to the first application function with the first AKMA application key.

17 Claims, 18 Drawing Sheets

(51) Int. Cl.
*H04W 12/041* (2021.01)
*H04W 12/0433* (2021.01)
*H04W 12/069* (2021.01)

(56) References Cited

U.S. PATENT DOCUMENTS

2024/0147232 A1* 5/2024 Viswambharan ..... H04W 12/06
2025/0056227 A1* 2/2025 Zhuang ............... H04W 12/041

OTHER PUBLICATIONS

"New SID on enhancement of AKMA", 3GPP TSG-SA3 Meeting #106-e, S3-220262, Agenda Item: 4.18, China Mobile, Feb. 14-25, 2022, 3 pages.
"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.5.0, Mar. 2022, 25 pages.
"Regulatory LI compliance of AKMA", 3GPP SA3LI#78e-d, S3i200477, SA3-LI, Aug. 25-26, 2020, 2 pages.
"3rd Generation Partnership Project; Technical Specification Group Services and System Aspects; Generic Authentication Architecture (GAA); Access to network application functions using Hypertext Transfer Protocol over Transport Layer Security (HTTPS) (Release 17)", 3GPP TS 33.222, V17.1.0, Dec. 2021, 37 pages.
"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.
"PCR on solution 7 enhancement ", 3GPP TSG-SA3 Meeting #110Ad-Hoc-e , S3-231813, Agenda Item: 5.6, Nokia, Apr. 17-21, 2023, 5 pages.
Extended European Search Report received for corresponding European Patent Application No. 23168845.8, dated Sep. 19, 2023, 6 pages.

* cited by examiner

AUTHENTICATION PROXY FOR AKMA AUTHENTICATION SERVICE

TECHNICAL FIELD

This disclosure is related to the field of communication systems and, in particular, to next generation networks.

BACKGROUND

Next generation networks, such as Fifth Generation (5G), denote the next major phase of mobile telecommunications standards beyond Fourth Generation (4G) standards. In comparison to 4G networks, next generation networks may be enhanced in terms of radio access and network architecture. Next generation networks intend to utilize new regions of the radio spectrum for Radio Access Networks (RANs), such as millimeter wave bands.

With mobile networks widely used across the country and the world, communications may be intercepted or suffer from other kinds of attacks. To ensure security and privacy, the 3rd Generation Partnership Project (3GPP) has set forth security mechanisms for 5G mobile networks, and the security procedures performed within the 5G mobile networks. One of the security procedures between User Equipment (UE) and a 5G mobile network is primary authentication and key agreement. Primary authentication and key agreement procedures enable mutual authentication between the UE and the network, and provide keying material that can be used between the UE and the serving network in subsequent security procedures.

Another security procedure is between UEs and application providers, and is referred to as Authentication and Key Management for Application (AKMA). AKMA is a feature that leverages an operator authentication infrastructure to secure communications between a UE and an Application Function (AF). AKMA is described in 3GPP TS 33.535 (v17.5.0), which is incorporated by reference as if fully included herein. AKMA reuses the 5G primary authentication procedure to authenticate a UE.

Some of the present AKMA authentication procedures may be inefficient, and it may be desirable to identify improvements to the AKMA authentication procedures.

SUMMARY

Described herein is an AKMA authentication service that utilizes an AKMA authentication proxy residing between a UE and a plurality of AFs. The AKMA authentication proxy interacts with an AKMA Anchor Function (AAnF) on behalf of the AFs to obtain keying material for application sessions between the UE and the AFs. One technical benefit is the AFs may rely on the AKMA authentication proxy to obtain the keying material, which is more cost efficient than the case where each of the AFs obtains the keying material separately from the AAnF.

In one embodiment, an AKMA authentication proxy comprises at least one processor, and at least one memory including computer program code. The processor causes the AKMA authentication proxy at least to receive an application session establishment request message from a User UE requesting an application session with a first application function, send a key request message toward an AAnF requesting AKMA application keys for a plurality of application functions, receive a key response message sent from the AAnF that includes the AKMA application keys, identify a first AKMA application key for the first application function from the AKMA application keys derived by the AAnF, and forward the application session establishment request message to the first application function with the first AKMA application key.

In one embodiment, the AKMA application keys are derived by the AAnF based on application function identities of the application functions provided in the key request message, and an AKMA anchor key.

In one embodiment, the processor further causes the AKMA authentication proxy at least to receive a subsequent application session establishment request message from the UE requesting an application session with a second application function, identify a second AKMA application key for the second application function from the AKMA application keys previously derived by the AAnF, and forward the subsequent application session establishment request message to the second application function with the second AKMA application key.

In one embodiment, the processor further causes the AKMA authentication proxy at least to identify a set of the application functions that are authorized for the UE, and send the key request message toward the AAnF requesting the AKMA application keys for the set of the application functions that are authorized for the UE.

In one embodiment, the processor further causes the AKMA authentication proxy at least to send an initial key request message toward the AAnF requesting the first AKMA application key for the first application function, receive an initial key response message sent from the AAnF that includes the first AKMA application key for the first application function and includes a UE identity of the UE, identify a set of the application functions that are authorized for the UE based on the UE identity, and send a subsequent key request message toward the AAnF requesting the AKMA application keys for the authorized application functions.

In one embodiment, a method of performing an AKMA authentication service is described. The method includes the following steps performed at an AKMA authentication proxy: receiving an application session establishment request message from a UE requesting an application session with a first application function, sending a key request message from the AKMA authentication proxy toward an AAnF requesting AKMA application keys for a plurality of application functions, receiving a key response message sent from the AAnF that includes the AKMA application keys, identifying a first AKMA application key for the first application function from the AKMA application keys derived by the AAnF, and forwarding the application session establishment request message from the AKMA authentication proxy to the first application function with the first AKMA application key.

In one embodiment, the method further comprises deriving, at the AAnF, the AKMA application keys based on application function identities of the application functions provided in the key request message, and an AKMA anchor key.

In one embodiment, the method further comprises receiving an application session establishment response message at the UE from the first application function, and deriving, at the UE, the first AKMA application key for the first application function based on an application function identity of the first application function, and an AKMA anchor key.

In one embodiment, the method further comprises the following steps performed at the AKMA authentication proxy: receiving a subsequent application session establishment request message from the UE requesting an application session with a second application function, identifying a second AKMA application key for the second application function from the AKMA application keys previously derived by the AAnF, and forwarding the subsequent application session establishment request message from the AKMA authentication proxy to the second application function with the second AKMA application key.

In one embodiment, the method further comprises receiving a subsequent application session establishment response message at the UE from the second application function, and deriving, at the UE, the second AKMA application key for the second application function based on an application function identity of the second application function, and an AKMA anchor key.

In one embodiment, sending the key request message from the AKMA authentication proxy toward the AAnF comprises sending the key request message from the AKMA authentication proxy toward the AAnF requesting the AKMA application keys for a set of the application functions that are authorized for the UE.

In one embodiment, the method further comprises the following steps performed at the AKMA authentication proxy: sending an initial key request message toward the AAnF requesting a first AKMA application key for the first application function, receiving an initial key response message sent from the AAnF that includes the first AKMA application key for the first application function and includes a UE identity of the UE, and identifying a set of the application functions that are authorized for the UE based on the UE identity. Sending the key request message from the AKMA authentication proxy toward the AAnF comprises sending a subsequent key request message toward the AAnF requesting the AKMA application keys for the authorized application functions.

Other embodiments may include computer readable media, other systems, or other methods as described below. The various features of the different embodiments may be variously combined with some features included and others excluded to suit a variety of different applications.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
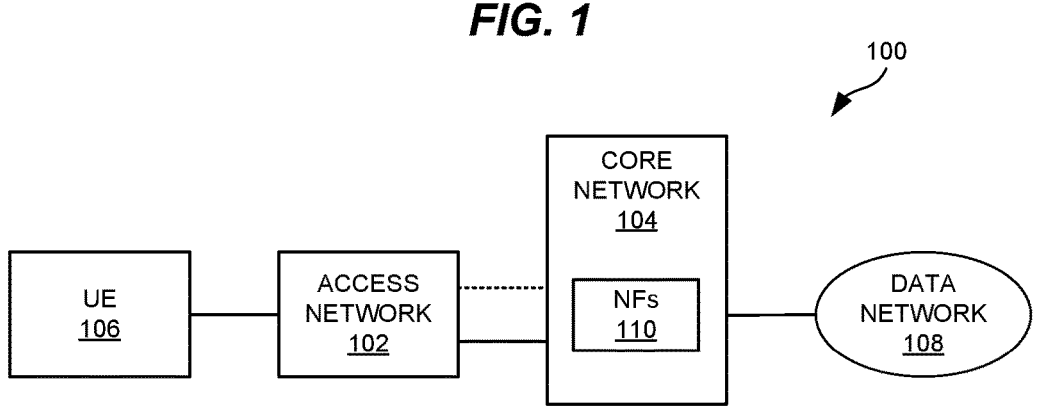
FIG. 1 illustrates a high-level architecture of a 5G system.

FIG. 1 illustrates a high-level architecture of a 5G system 100. A 5G system 100 is a communication system (e.g., a 3GPP system) comprising a 5G Access Network ((R)AN) 102, a 5G Core Network (CN) 104, and 5G User Equipment (UE) 106. Access network 102 may comprise an NG-RAN and/or a non-3GPP access network connecting to a 5G core network 104. Access network 102 may support Evolved-UMTS Terrestrial Radio Access Network (E-UTRAN) access (e.g., through an eNodeB, gNodeB, and/or ng-eNodeB), Wireless Local Area Network (WLAN) access, fixed access, satellite radio access, new Radio Access Technologies (RAT), etc. Core network 104 interconnects access network 102 with a data network (DN) 108. Core network 104 is comprised of Network Functions (NF) 110, which may be implemented either as a network element on dedicated hardware, as a software instance running on dedicated hardware, as a virtualized function instantiated on an appropriate platform (e.g., a cloud infrastructure), etc. Data network 108 may be an operator external public or private data network, or an intra-operator data network (e.g., for IMS services). UE 106 is a 5G capable device configured to register with core network 104 to access services. UE 106 may be an end user device, such as a mobile phone (e.g., smartphone), a tablet or PDA, a computer with a mobile broadband adapter, etc. UE 106 may be enabled for voice services, data services, Machine-to-Machine (M2M) or Machine Type Communications (MTC) services, and/or other services.

Figure 2:
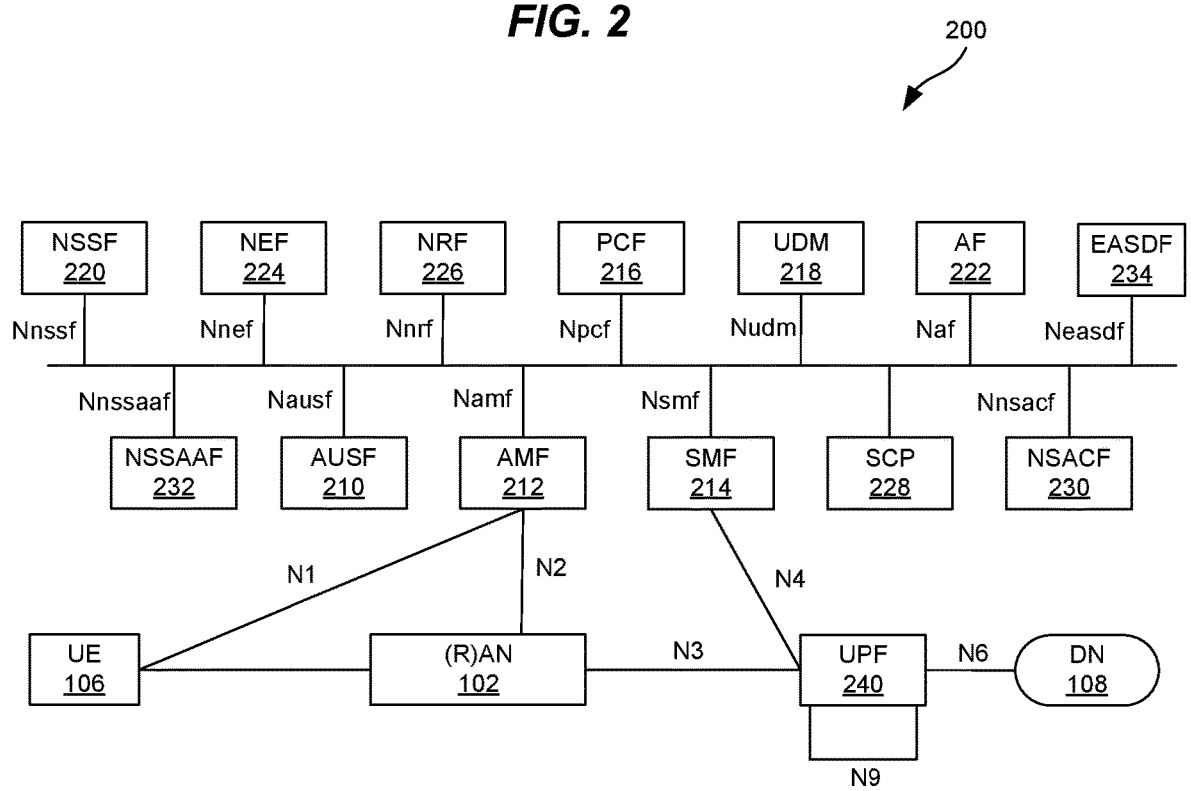
FIG. 2 illustrates a non-roaming architecture of a 5G system.

FIG. 2 illustrates a non-roaming architecture 200 of a 5G system. The architecture 200 in FIG. 2 is a service-based representation, as is further described in 3GPP TS 23.501 (v17.4.0), which is incorporated by reference as if fully included herein. Architecture 200 is comprised of Network Functions (NF) for a core network 104, and the NFs for the control plane (CP) are separated from the user plane (UP). The control plane of the core network 104 includes an Authentication Server Function (AUSF) 210, an Access and Mobility Management Function (AMF) 212, a Session Management Function (SMF) 214, a Policy Control Function (PCF) 216, a Unified Data Management (UDM) 218, a Network Slice Selection Function (NSSF) 220, and an Application Function (AF) 222. The control plane of the core network 104 further includes a Network Exposure Function (NEF) 224, a NF Repository Function (NRF) 226, a Service Communication Proxy (SCP) 228, a Network Slice Admission Control Function (NSACF) 230, a Network Slice-specific and SNPN Authentication and Authorization Function (NSSAAF) 232, and an Edge Application Server Discovery Function (EASDF) 234. The user plane of the core network 104 includes one or more User Plane Functions (UPF) 240 that communicate with data network 108. UE 106 is able to access the control plane and the user plane of the core network 104 through (R)AN 102.

There are a large number of subscribers that are able to access services from a carrier that implements a mobile network comprising a 5G system 100, such as in FIGS. 1-2. Communications between the subscribers (i.e., through a UE) and the mobile network are protected by security mechanisms, such as the ones standardized by the 3GPP. Subscribers and the carrier expect security guarantees from the security mechanisms. One of the security mechanisms is the primary authentication procedure that provides mutual authentication between the UE and the network. The following further illustrates primary authentication.

The purpose of the primary authentication and key agreement procedures is to enable mutual authentication between UE 106 and the network, and provide keying material that can be used between the UE 106 and the serving network in subsequent security procedures. The keying material generated by the primary authentication and key agreement procedure results in an anchor key called the KSEAF key provided by the AUSF 210 of the home network to the Security Anchor Function (SEAF) of the serving network. The SEAF provides authentication functionality via the AMF 212 in the serving network, and supports primary authentication using a Subscription Concealed Identifier (SUCI) that contains the concealed Subscription Permanent Identifier (SUPI). The SUPI is a globally unique 5G identifier allocated to each subscriber in the 5G system 100. The SUCI is composed a SUPI type, a Home Network Identifier (HN-ID) identifying the home network of the subscriber, a Routing Indicator (RID) that is assigned to the subscriber by the home network operator and provisioned in the Universal Subscriber Identity Module (USIM) of the UE, a Protection Scheme Identifier, a Home Network Public Key Identifier, and a Scheme Output. The anchor key $K_{SEAF}$ is derived from an intermediate key called the $K_{AUSF}$ key. The $K_{AUSF}$ key is established between the UE 106 and the home network resulting from the primary authentication procedure.

Figure 3:
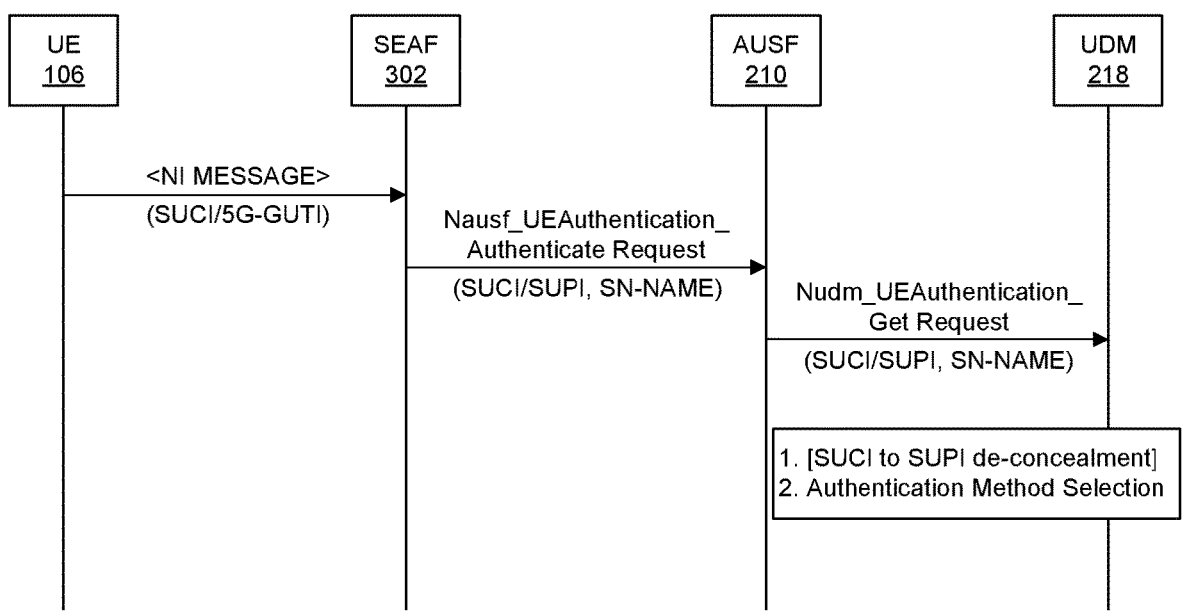
FIG. 3 is a signaling diagram that illustrates initiation of primary authentication.

FIG. 3 is a signaling diagram that illustrates initiation of primary authentication, such as described in 3GPP TS 33.501 (v17.5.0). UE 106 transmits an N1 message (i.e., an initial Non-Access Stratum (NAS) message) to the serving network (e.g., the AMF 212 of the serving network), such as a Registration Request. UE 106 uses the SUCI or a 5G Global Unique Temporary Identifier (5G-GUTI) in the Registration Request. SEAF 302 of the AMF 212 may initiate an authentication with UE 106 during any procedure establishing a signaling connection with UE 106. SEAF 302 invokes the Nausf_UEAuthentication service by sending a Nausf_UEAuthentication_Authenticate Request message to AUSF 210 to initiate an authentication. The Nausf_UEAuthentication_Authenticate Request message includes the SUCI or SUPI, and the serving network name (SN-Name). Upon receiving the Nausf_UEAuthentication_Authenticate Request message, AUSF 210 checks that the requesting SEAF 302 in the serving network is entitled to use the serving network name in the Nausf_UEAuthentication_Authenticate Request message by comparing the serving network name with the expected serving network name When the serving network is authorized to use the serving network name, AUSF 210 sends a Nudm_UEAuthentication_Get Request message to UDM 218. The Nudm_UEAuthentication_Get Request message includes the SUCI or SUPI, and the serving network name. Upon reception of the Nudm_UEAuthentication_Get Request message, UDM 218 identifies the SUPI (if received), or invokes a Subscription Identifier De-concealing Function (SIDF) that de-conceals the SUPI from the SUCI (if received). UDM 218 (or an Authentication credential Repository and Processing Function (ARPF) of UDM 218) chooses the authentication method for primary authentication based on the SUPI.

Figure 4:
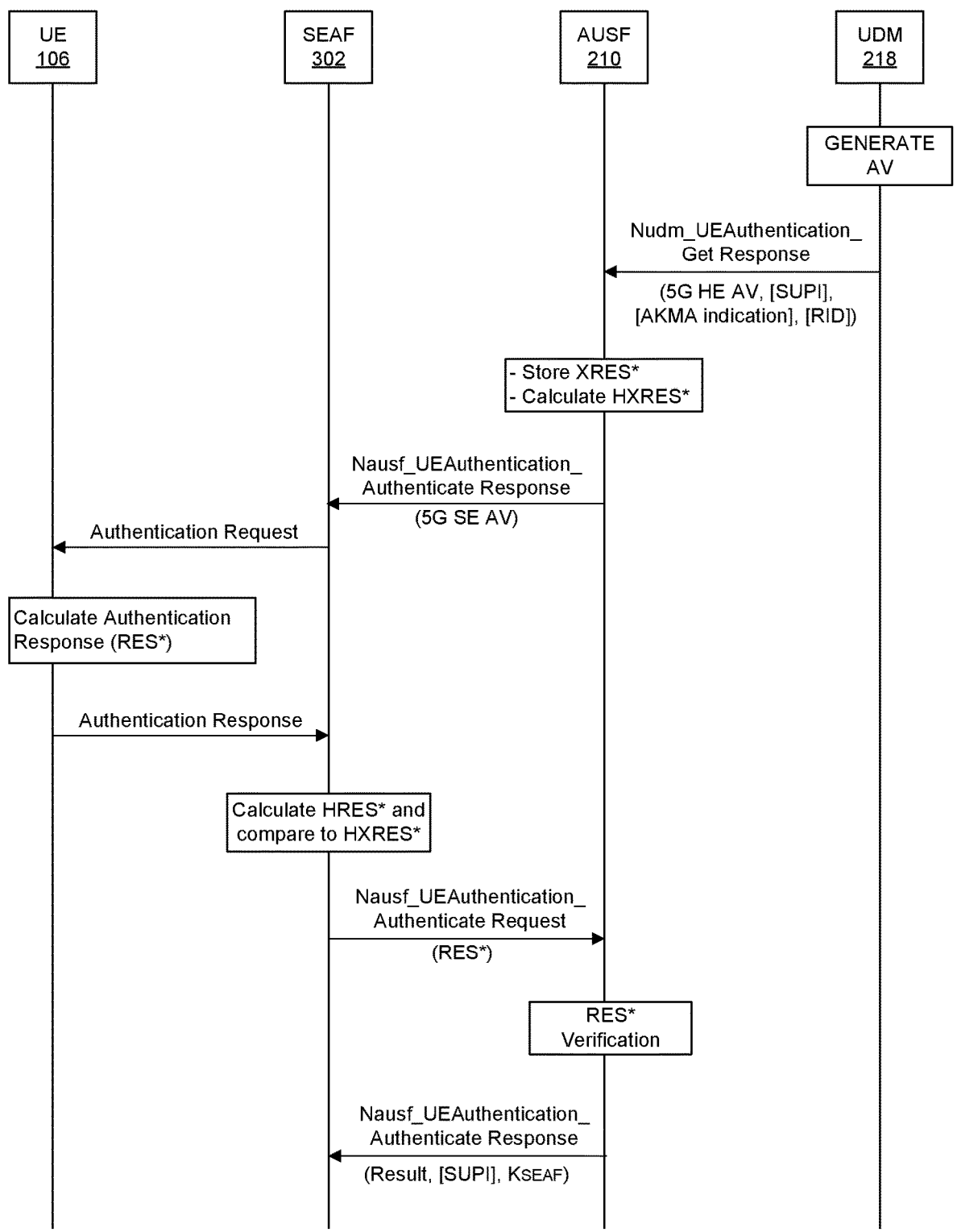
FIG. 4 is a signaling diagram that illustrates an authentication procedure.

FIG. 4 is a signaling diagram that illustrates an authentication procedure, such as described in 3GPP TS 33.501. For a Nudm_UEAuthentication_Get Request, UDM 218 creates a 5G Home Environment Authentication Vector (5G HE AV). UDM 218 derives the KAUSF key and calculates an expected response (XRES*) to a challenge. UDM 218 creates the 5G HE AV comprising an authentication token (AUTN), the expected response (XRES*), the $K_{AUSF}$ key, and a random challenge (RAND). UDM 218 then sends a Nudm_UEAuthentication_Get Response message to AUSF 210 with the 5G HE AV to be used for authentication (e.g., 5G Authentication and Key Agreement (AKA)). In case the SUCI was included in the Nudm_UEAuthentication_Get Request, UDM 218 includes the SUPI in the Nudm_UEAuthentication_Get Response message after deconcealment of the SUCI. If a subscriber has an AKMA subscription, UDM 218 includes an AKMA indication and the RID in the Nudm_UEAuthentication_Get Response message.

In response to the Nudm_UEAuthentication_Get Response message, AUSF 210 stores the expected response (XRES*) temporarily with the received SUCI or SUPI. AUSF 210 then generates a 5G Authentication Vector (5G AV) from the 5G HE AV received from UDM 218, by computing the hash expected response (HXRES*) from the expected response (XRES*) and the $K_{SEAF}$ key from the $K_{AUSF}$ key, and replacing the XRES* with the HXRES* and the $K_{AUSF}$ key with the $K_{SEAF}$ key in the 5G HE AV. AUSF 210 removes the $K_{SEAF}$ key to generate a 5G Serving Environment Authentication Vector (5G SE AV) that includes the authentication token (AUTN), hash expected response (HXRES*), and the random challenge (RAND). AUSF 210 sends a Nausf_UEAuthentication_Authenticate Response message to SEAF 302 that includes the 5G SE AV. In response, SEAF 302 sends the authentication token (AUTN) and the random challenge (RAND) to UE 106 in a NAS message Authentication Request message.

Although not shown in FIG. 4, UE 106 includes Mobile Equipment (ME) and a USIM. The ME receives the authentication token (AUTN) and the random challenge (RAND) in the NAS message Authentication Request, and forwards the authentication token (AUTN) and the random challenge (RAND) to the USIM. The USIM verifies the freshness of the received values by checking whether the authentication token (AUTN) can be accepted. If so, the USIM computes a response (RES), a cipher key (CK), and an integrity key (IK) based on the random challenge (RAND), and returns the response (RES), the CK key, and the IK key to the ME. The ME computes RES* from RES, and calculates the $K_{AUSF}$ key from CK||IK and the $K_{SEAF}$ key from the $K_{AUSF}$ key.

UE 106 sends a NAS message Authentication Response message to SEAF 302 that includes RES*. In response, SEAF 302 computes HRES* from RES*, and compares HRES* and HXRES*. If they coincide, SEAF 302 considers the authentication successful from the serving network point of view. SEAF 302 sends RES*, as received from UE 106, in a Nausf_UEAuthentication_Authenticate Request message to AUSF 210. When AUSF 210 receives the Nausf_UEAuthentication_Authenticate Request message including a RES* as authentication confirmation, AUSF 210 stores the $K_{AUSF}$ key based on the home network operator's policy, and compares the received RES* with the stored XRES*. If the RES* and XRES* are equal, then AUSF 210 considers the authentication successful from the home network point of view. AUSF 210 informs UDM 218 about the authentication result (not shown). AUSF 210 also sends a Nausf_UEAuthentication_Authenticate Response message to SEAF 302 indicating whether or not the authentication was successful from the home network point of view. If the authentication was successful, the $K_{SEAF}$ key is sent to SEAF 302 in the Nausf_UEAuthentication_Authenticate Response message. In case AUSF 210 received the SUCI from SEAF 302 in the authentication request, AUSF 210 includes the SUPI in the Nausf_UEAuthentication_Authenticate Response message if the authentication was successful.

AKMA (Authentication and Key Management for Application) is a feature that leverages an operator authentication infrastructure to secure communications between a UE 106 and an AF 222. AKMA reuses the 5G primary authentication procedure to authenticate a UE 106. A successful 5G primary authentication results in the $K_{AUSF}$ key being stored at AUSF 210 and UE 106. A network model for AKMA includes an AKMA Anchor Function (AAnF), which is the anchor function in the Home Public Land Mobile Network (HPLMN). The AAnF stores an AKMA Anchor Key ($K_{AKMA}$) and the SUPI for the AKMA service, which is received from AUSF 210 after the UE 106 completes a successful 5G primary authentication. The AAnF also generates the keying material to be used between the UE 106 and AF 222 for an application session, and maintains UE AKMA contexts.

Figure 5:
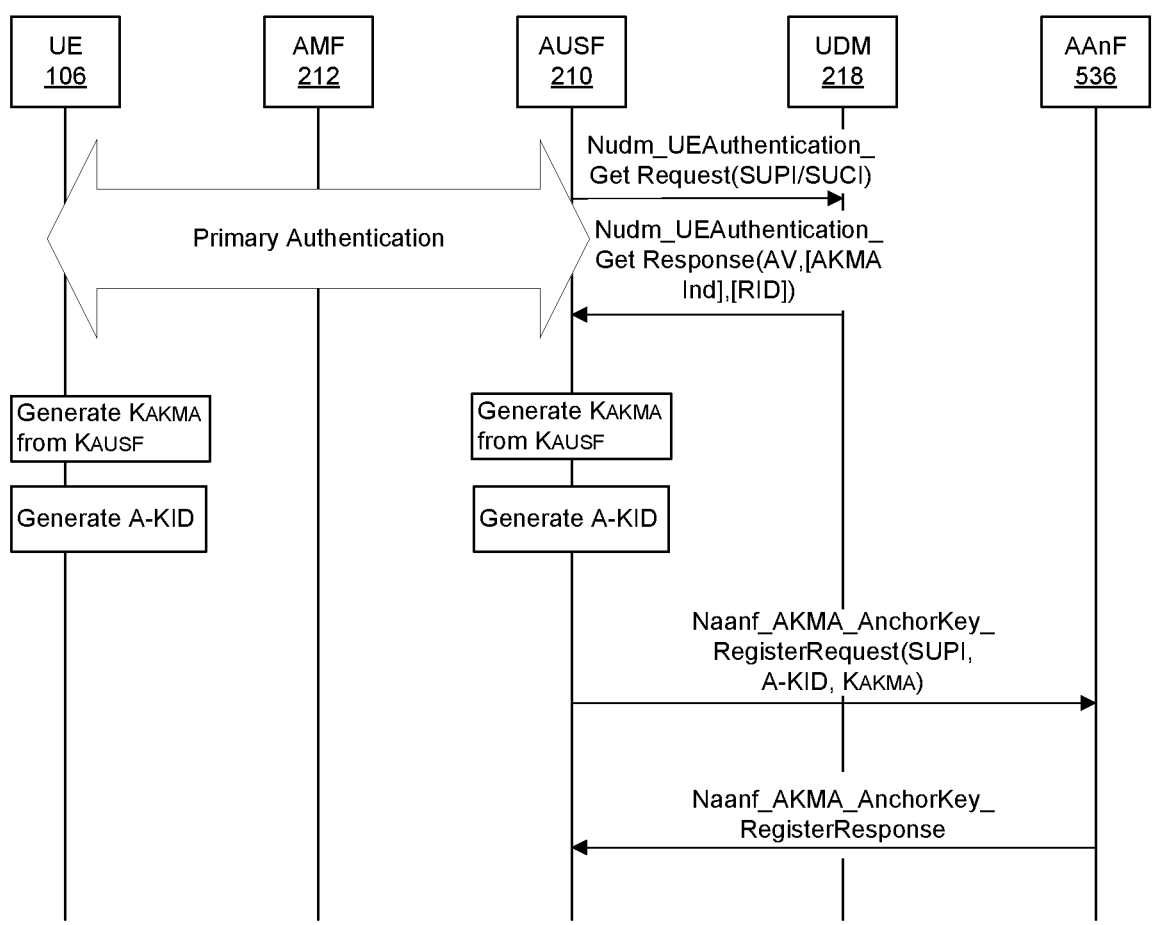
FIG. 5 is a signaling diagram that illustrates generating of the AKMA Anchor Key ($K_{AKMA}$) after primary authentication.

FIG. 5 is a signaling diagram that illustrates generating of the AKMA Anchor Key ($K_{AKMA}$) after primary authentication. During the primary authentication procedure, AUSF 210 interacts with UDM 218 in order to fetch authentication information, such as subscription credentials (e.g., AKA Authentication vectors) and the authentication method using the Nudm_UEAuthentication_Get Request service operation. In the response, UDM 218 may also provide an AKMA indication to AUSF 210 whether the $K_{AKMA}$ key needs to be generated for UE 106. If the AKMA indication is included, UDM 218 also includes the RID of UE 106 in the Nudm_UEAuthentication_Get Request.

If AUSF 210 receives the AKMA indication from UDM 218, AUSF 210 stores the $K_{AUSF}$ key, and generates the $K_{AKMA}$ key and the AKMA Key Identifier (A-KID) from the $K_{AUSF}$ key after the primary authentication procedure is successfully completed. Likewise, before UE 106 initiates an application session with an AKMA AF 222, UE 106 generates the $K_{AKMA}$ key and the A-KID from the $K_{AUSF}$ key. After the AKMA keying material is generated, AUSF 210 selects the AAnF 536 and sends the A-KID and the $K_{AKMA}$ key to AAnF 536 along with the SUPI of UE 106 using the Naanf_AKMA_AnchorKey_Register Request service operation. AAnF 536 stores the latest information set by AUSF 210, and sends a response to AUSF 210 using the Naanf_AKMA_AnchorKey_Register Response service operation.

One potential problem may be encountered in a conventional AKMA authentication procedure according to Release 17 of 3GPP TS 33.535 when UE 106 establishes application sessions with multiple AFs 222. As an overview, to establish an application session with an AF 222, UE 106 sends an Application Session Establishment Request message to the AF 222. The AF 222 performs a key request procedure to query the AAnF 536 or NEF 224 for an AKMA Application Key, called $K_{AF}$, which is used as keying material for the application session between UE 106 and AF 222. This key request procedure is executed separately for each AF 222, which can be a burden on the AAnF 536 or NEF 224.

Figure 6A:
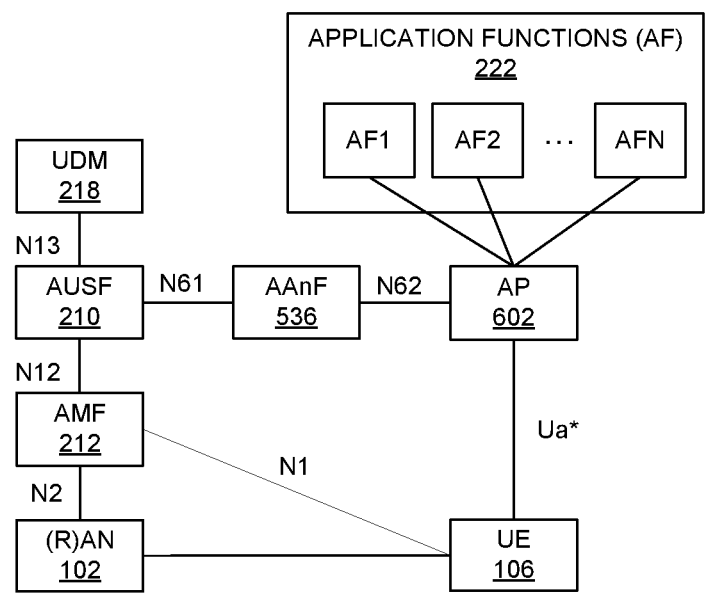
FIGS. 6A-6B illustrate AKMA architectures that include an AKMA authentication proxy in illustrative embodiments.
Figure 6B:
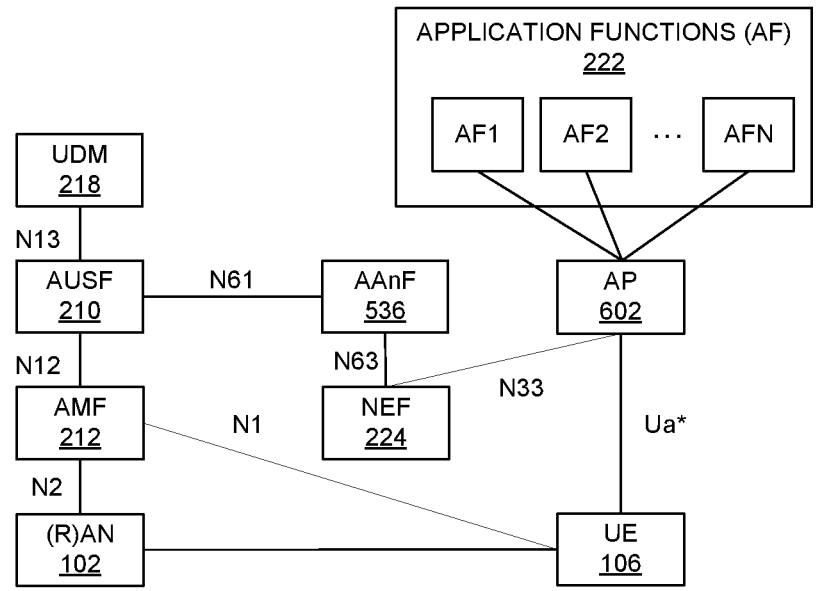

To address this and potentially other issues, an AKMA Authentication Proxy (AP) is introduced. FIGS. 6A-6B illustrate AKMA architectures 600-601 that include an AKMA authentication proxy 602 in illustrative embodiments. FIG. 6A illustrates an AKMA architecture 600 in reference point representation for internal AFs (i.e., AFs located inside the operator's network). FIG. 6B illustrates an AKMA architecture 601 in reference point representation for external AFs (i.e., AFs located outside the operator's network).

AKMA architecture 600 includes AUSF 210, AMF 212, UDM 218, and AAnF 536, while AKMA architecture 601 includes AUSF 210, AMF 212, UDM 218, AAnF 536, and NEF 224. AKMA architectures 600-601 further include an AKMA Authentication Proxy (AP) 602. An AKMA authentication proxy 602 is a server, network function, network element, application, a reverse proxy with additional functionality, etc., that resides or is implemented between a UE 106 and a plurality of AFs 222 (e.g., AF1, AF2, ..., AFN). AFs 222 are enabled for AKMA authentication procedures, and may be referred to as AKMA AFs. AKMA authentication proxy 602 is configured to perform operations or functions of an AKMA authentication service. For example, an AKMA authentication proxy 602 may interact with AAnF 536 (see FIG. 6A) or NEF 224 (see FIG. 6B) to execute AKMA authentication procedures (e.g., key request procedure) on behalf of the AF(s) 222. AKMA authentication proxy 602 provides a technical benefit in that AFs 222 may rely on AKMA authentication proxy 602 to execute AKMA authentication procedures, which is more cost efficient than the case where each AF 222 executes AKMA authentication procedures separately.

Figure 7:
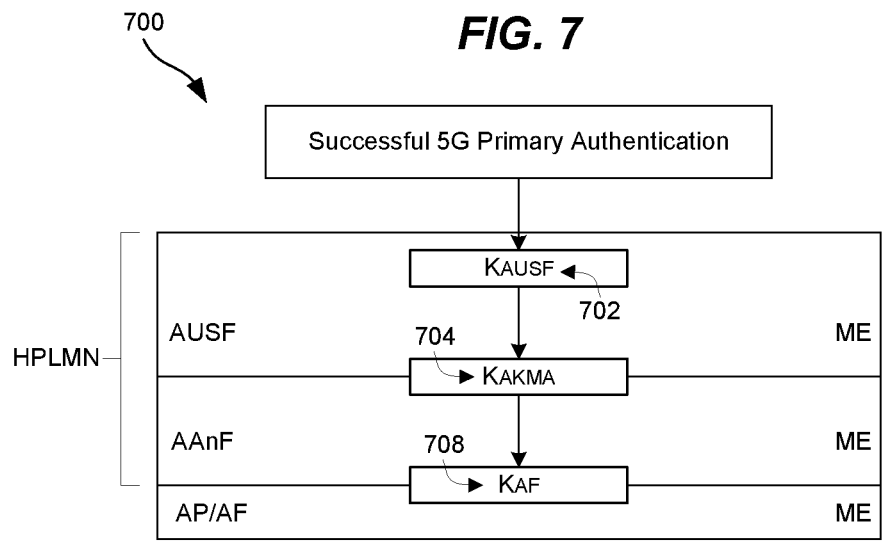
FIG. 7 illustrates an AKMA key hierarchy.

FIG. 7 illustrates an AKMA key hierarchy 700. The AKMA key hierarchy 700 includes the following keys: $K_{AUSF}$ 702, $K_{AKMA}$ 704, and $K_{AF}$ 708. The $K_{AUSF}$ key 702 is generated by AUSF 210 as described above. The $K_{AKMA}$ key 704 is derived by AUSF 210 and by UE 106 (i.e., Mobile Equipment (ME) of UE 106) from the $K_{AUSF}$ key 702. The $K_{AF}$ key 708 is derived by AAnF 536 and by UE 106 (i.e., ME) from the $K_{AKMA}$ key 704.

Figure 8:
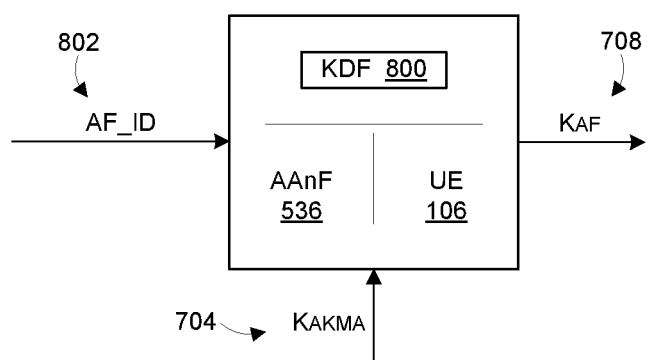
FIG. 8 is a block diagram illustrating key derivation of an AKMA Application key ($K_{AF}$).

FIG. 8 is a block diagram illustrating key derivation of an AKMA Application key ($K_{AF}$) 708. The $K_{AF}$ key 708 is derived from a KDF 800 using the $K_{AKMA}$ key 704 as an input key. The input parameter to the KDF 800 is an address or identity (e.g., AF_ID 802) of an AF 222. More particularly, the input parameter and their lengths are concatenated into a string S as: S=FC||P0||L0||P1||L1||P2||L2||P3||L3|| . . . ||Pn||Ln. FC is used to distinguish between different instances of the algorithm, and is either a single octet or consists of two octets of the form FC1||FC2 where FC1=0xFF and FC2 is a single octet. P0 . . . Pn are the n+1 input parameter encodings, and L0 . . . Ln are the two-octet representations of the length of the corresponding input parameter encodings P0 . . . Pn. When deriving the $K_{AF}$ key 708 from the $K_{AKMA}$ key 704, the following input parameters may be used to form the string S that is input to KDF 800:

FC=0x82;
P0 =AF_ID; and
L0=length of AF_ID.

The AF_ID is constructed as: AF_ID=FQDN of the AF||Ua* security protocol identifier.

The $K_{AF}$ key 708 is computed from the KDF 800 on the string S using the $K_{AKMA}$ key 704 as the input key. Derivation of the $K_{AF}$ key 708 may be performed in the AAnF 536 and/or UE 106 (i.e., ME) as illustrated in FIG. 8.

Figure 9:
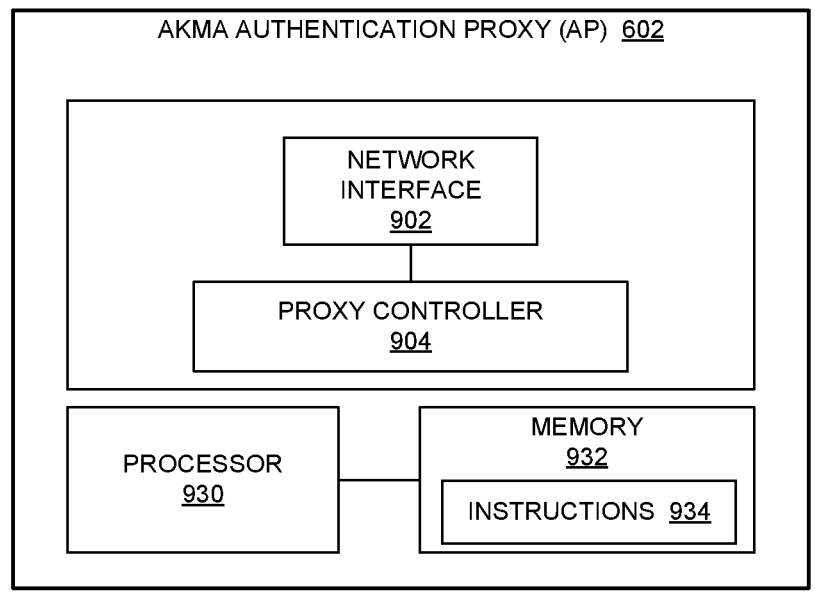
FIG. 9 is a block diagram of an AKMA authentication proxy in an illustrative embodiment.

FIG. 9 is a block diagram of an AKMA authentication proxy 602 in an illustrative embodiment. In this embodiment, AKMA authentication proxy 602 includes the following subsystems: a network interface component 902, and a proxy controller 904 that operate on one or more platforms. Network interface component 902 may comprise circuitry, logic, hardware, means, etc., configured to exchange control plane messages or signaling with other network elements and/or UEs. Network interface component 902 may operate using a variety of protocols (including NAS protocol) or reference points. Proxy controller 904 may comprise circuitry, logic, hardware, means, etc., configured to support operations, procedures, or functions of an AKMA authentication service.

One or more of the subsystems of AKMA authentication proxy 602 may be implemented on a hardware platform comprised of analog and/or digital circuitry. One or more of the subsystems of AKMA authentication proxy 602 may be implemented on one or more processors 930 that execute instructions 934 (i.e., computer readable code) for software that are loaded into memory 932. A processor 930 comprises an integrated hardware circuit configured to execute instructions 934 to provide the functions of AKMA authentication proxy 602. Processor 930 may comprise a set of one or more processors or may comprise a multi-processor core, depending on the particular implementation. Memory 932 is a non-transitory computer readable storage medium for data, instructions, applications, etc., and is accessible by processor 930. Memory 932 is a hardware storage device capable of storing information on a temporary basis and/or a permanent basis. Memory 932 may comprise a random-access memory, or any other volatile or non-volatile storage device. One or more of the subsystems of AKMA authentication proxy 602 may be implemented on a cloud-computing platform or another type of processing platform.

AKMA authentication proxy 602 may include various other components not specifically illustrated in FIG. 9.

Figure 10:
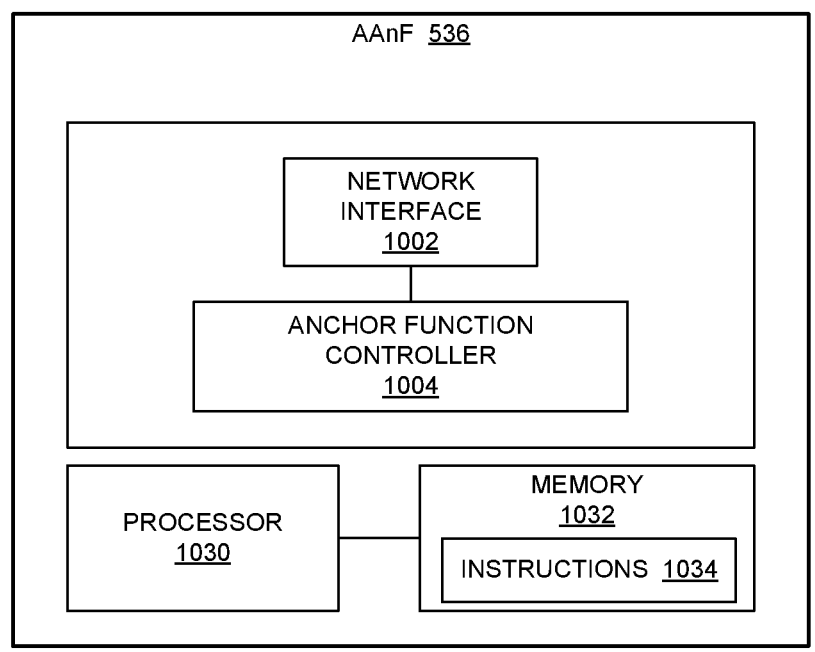
FIG. 10 is a block diagram of an AAnF in an illustrative embodiment.

FIG. 10 is a block diagram of an AAnF 536 in an illustrative embodiment. In this embodiment, AAnF 536 includes the following subsystems: a network interface component 1002, and an anchor function controller 1004 that operate on one or more platforms. Network interface component 1002 may comprise circuitry, logic, hardware, means, etc., configured to exchange control plane messages or signaling with other network elements and/or UEs. Network interface component 1002 may operate using a variety of protocols (including NAS protocol) or reference points. Anchor function controller 1004 may comprise circuitry, logic, hardware, means, etc., configured to support operations, procedures, or functions of an AKMA authentication service.

One or more of the subsystems of AAnF 536 may be implemented on a hardware platform comprised of analog and/or digital circuitry. One or more of the subsystems of AAnF 536 may be implemented on one or more processors 1030 that execute instructions 1034 (i.e., computer readable code) for software that are loaded into memory 1032. One or more of the subsystems of AAnF 536 may be implemented on a cloud-computing platform or another type of processing platform.

AAnF 536 may include various other components not specifically illustrated in FIG. 10.

Figure 11:
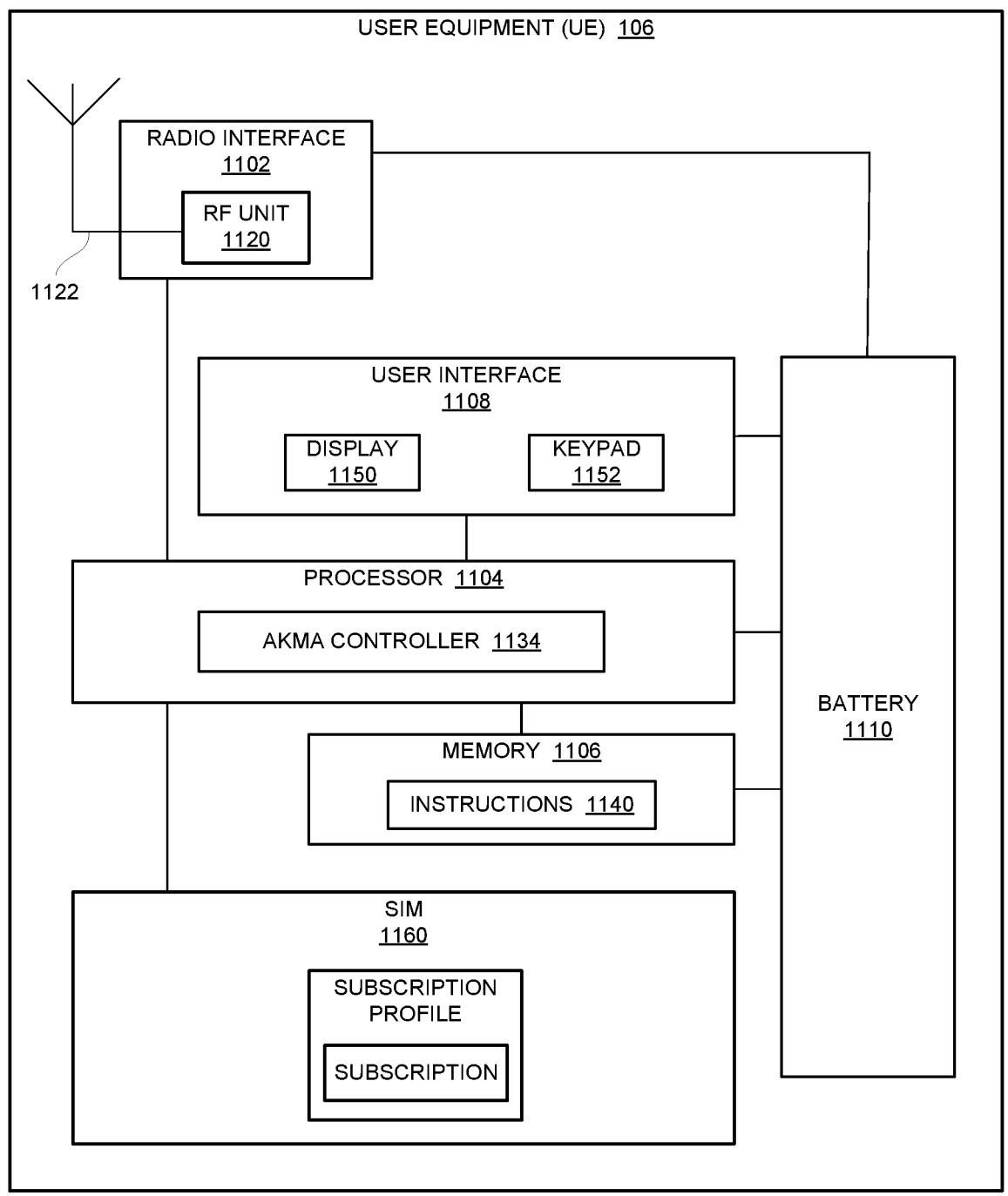
FIG. 11 is a block diagram of a UE in an illustrative embodiment.

FIG. 11 is a block diagram of a UE 106 in an illustrative embodiment. UE 106 includes a radio interface component 1102, one or more processors 1104, a memory 1106, a user interface component 1108, and a battery 1110. Radio interface component 1102 is a hardware component that represents the local radio resources of UE 106, such as an RF unit 1120 (e.g., one or more radio transceivers) and one or more antennas 1122. Radio interface component 1102 may be configured for WiFi, Bluetooth, 5G New Radio (NR), Long-Term Evolution (LTE), etc. Processor 1104 represents the internal circuitry, logic, hardware, etc., that provides the functions of UE 106. Processor 1104 may be configured to execute instructions 1140 (i.e., computer program code) for software that are loaded into memory 1106. Processor 1104 may comprise a set of one or more processors or may comprise a multi-processor core, depending on the particular implementation. Memory 1106 is a computer readable storage medium for data, instructions 1140, applications, etc., and is accessible by processor 1104. Memory 1106 is a hardware storage device capable of storing information on a temporary basis and/or a permanent basis. Memory 1106 may comprise a random-access memory, or any other volatile or non-volatile storage device. User interface component 1108 is a hardware component for interacting with an end user. For example, user interface component 1108 may include a display 1150, screen, touch screen, or the like (e.g., a Liquid Crystal Display (LCD), a Light Emitting Diode (LED) display, etc.). User interface component 1108 may include a keyboard or keypad 1152, a tracking device (e.g., a trackball or trackpad), a speaker, a microphone, etc. UE 106 may include various other components not specifically illustrated in FIG. 11.

UE 106 also includes a Subscriber Identity Module (SIM) 1160, which is an integrated circuit that provides security and integrity functions for UE 106 (e.g., SIM card, Universal SIM (USIM), etc.). SIM 1160 includes or is provisioned with one or more subscription profiles for UE 106. A subscription profile has an associated subscription, subscription parameters, subscription credentials, etc. Subscription credentials are a set of values that includes a public key of its home network, a long-term secret key (K), and a subscription identifier (e.g., SUPI) used to uniquely identify a subscription and to mutually authenticate the UE 106 and a network.

Processor 1104 may implement an AKMA controller 1134 in this embodiment. AKMA controller 1134 is configured to support operations, procedures, or functions of an AKMA authentication service.

The following describes operations of AKMA authentication proxy (AP) 602, AAnF 536, and UE 106 for an AKMA authentication procedure. In the embodiments below, AKMA authentication proxy 602 engages AAnF 536 to perform collective key generation for $K_{AF}$ keys 708. In other words, AKMA authentication proxy 602 requests key derivation for multiple $K_{AF}$ keys 708, instead of requesting key derivation individually for AFs 222.

Figure 12A:
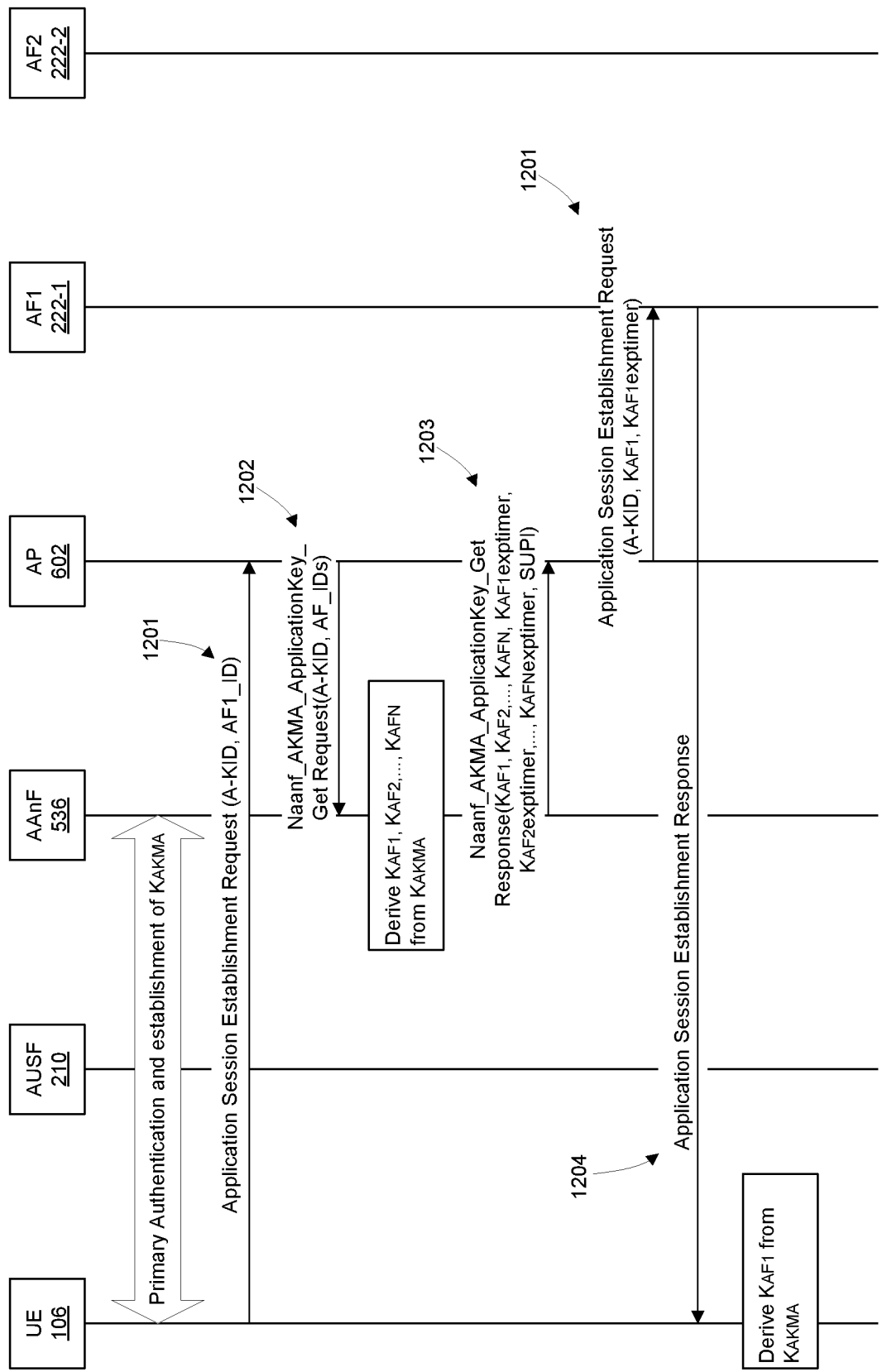
FIGS. 12A-12D are signaling diagrams illustrating key generation for an AKMA authentication service in illustrative embodiments.
Figure 12B:
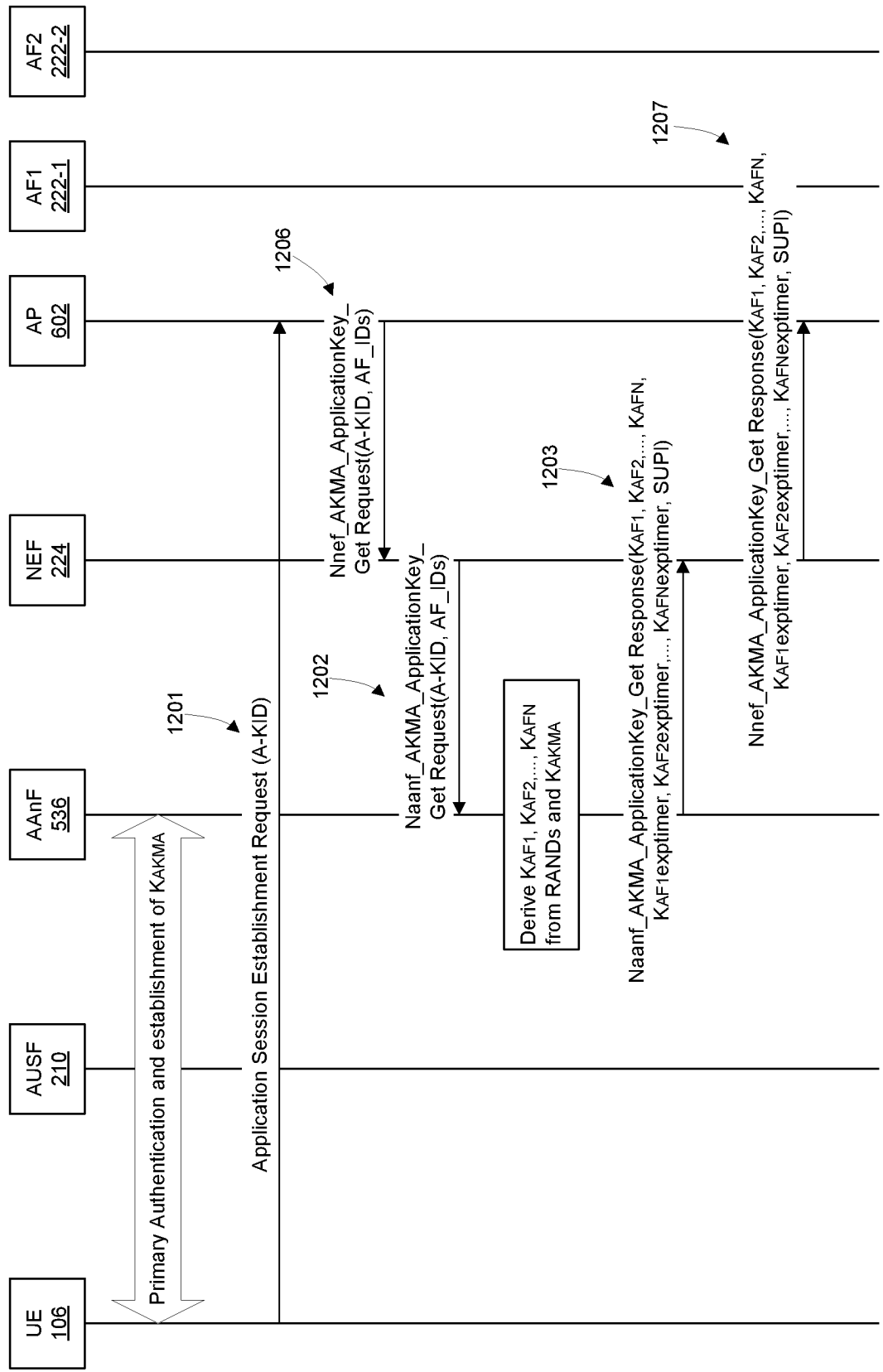

FIGS. 12A-12D are signaling diagrams illustrating key generation for an AKMA authentication service in illustrative embodiments. More particularly, FIGS. 12A-12B illustrate generating of $K_{AF}$ keys 708 collectively for multiple AFs 222. A pre-requisite is that primary authentication is successful and establishment of $K_{AKMA}$ is performed. Assume for one embodiment that UE 106 wants to establish an application session with AF 222-1, which may be referred to as a first AF 222-1. An application session is a session between a UE and an AF on the application layer (i.e., Layer-7). To establish the application session, UE 106 sends an Application Session Establishment Request message 1201 to AKMA authentication proxy 602. For example, UE 106 may be programmed with an Authentication Proxy (AP) identity (AP_ID) of AKMA authentication proxy 602, and sends the Application Session Establishment Request message 1201 to AKMA authentication proxy 602. UE 106 includes the A-KID and the AF identity for AF 222-1 (e.g., AF1_ID) in the Application Session Establishment Request message 1201.

Figure 13:
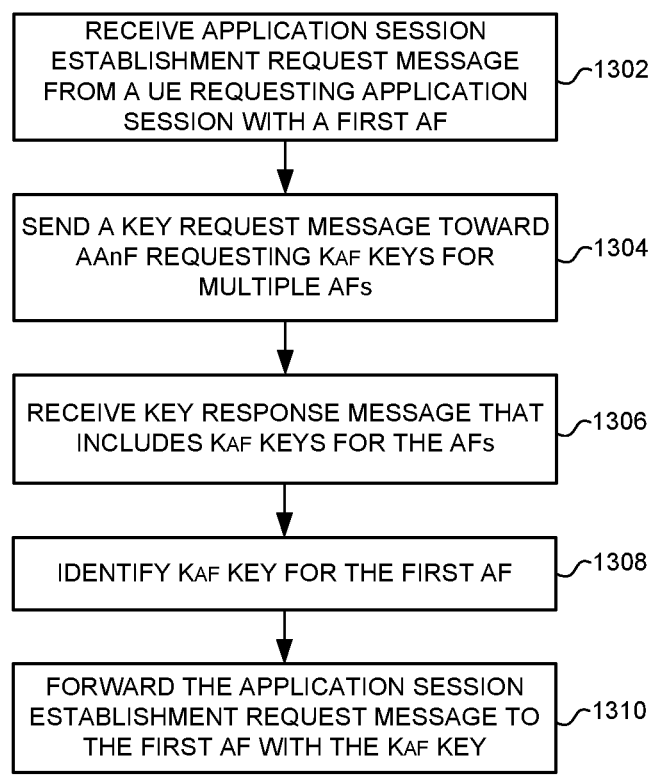
FIG. 13 is a flow chart illustrating a method of performing an AKMA authentication service in an AKMA authentication proxy in an illustrative embodiment.

In response to the Application Session Establishment Request message 1201, AKMA authentication proxy 602 initiates a key generation procedure for a plurality of $K_{AF}$ keys 708. FIG. 13 is a flow chart illustrating a method 1300 of performing an AKMA authentication service in an AKMA authentication proxy 602 in an illustrative embodiment. Proxy controller 904 of AKMA authentication proxy 602 receives the Application Session Establishment Request message 1201 from UE 106 (step 1302), such as through network interface component 902. The Application Session Establishment Request message 1201 from UE 106 may be referred to as a first or initial Application Session Establishment Request message. In response to the Application Session Establishment Request message 1201, proxy controller 904 determines whether a key derivation procedure has been performed for UE 106. For example, proxy controller 904 may determine whether or not it stores a $K_{AF}$ key mapped to the AF identity (e.g., AF1_ID) of AF 222-1. In this example, a key derivation procedure has not already been performed. Thus, proxy controller 904 engages with AAnF 536 for a key derivation procedure for UE 106. In this embodiment, proxy controller 904 sends a key request message toward AAnF 536 requesting the $K_{AF}$ keys 708 for multiple AFs 222 (step 1304), such as through network interface component 902. As described above, AKMA authentication proxy 602 resides between UE 106 and a plurality of AFs 222, and therefore manages or supports multiple AFs 222. Proxy controller 904 may identify the AF_IDs for the AFs 222 it supports. In the key request message, proxy controller 904 may request keys for each of the AFs 222 that are supported by AKMA authentication proxy 602. In another example, proxy controller 904 may request keys for some of the AFs 222 (i.e., a subset), such as a set or group (i.e., two or more) of prospective AFs 222 that UE 106 may engage in an application session, a set or group of authorized AFs 222 that are authorized for UE 106, etc. Proxy controller 904 includes the A-KID and the AF identities (AF_IDs) of the AFs 222 in the key request message. The key request message at least includes the AF identity of AF 222-1 as indicated in the Application Session Establishment Request message 1201 from UE 106. As shown in FIG. 12A, proxy controller 904 may send a Naanf_AKMA_ApplicationKey_Get Request message 1202 directly to AAnF 536 with the A-KID and AF_IDs. As shown in FIG. 12B, proxy controller 904 may send a key request message toward AAnF 536 via the NEF service Application Programming Interface (API). Proxy controller 904 sends an Nnef_AKMA_ApplicationKey_Get Request message 1206 to NEF 224, and NEF 224 in turn sends an Naanf_AKMA_ApplicationKey_Get Request message 1202 to AAnF 536.

Figure 14:
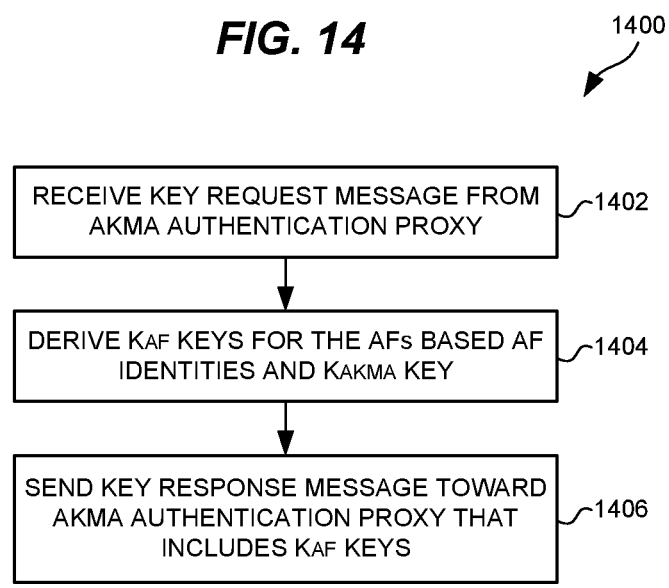
FIG. 14 is a flow chart illustrating a method of performing an AKMA authentication service in an AAnF in an illustrative embodiment.

In response to the key request message (e.g., Naanf_AKMA_ApplicationKey_Get Request message 1302), AAnF 536 derives $K_{AF}$ keys 708 for the AF identities provided in the key request message. FIG. 14 is a flow chart illustrating a method 1400 of performing an AKMA authentication service in an AAnF 536 in an illustrative embodiment. Anchor function controller 1004 of AAnF 536 receives the key request message from AKMA authentication proxy 602 or NEF 224 (step 1402), such as through network interface component 1002. In response to the key request message, anchor function controller 1004 may verify whether the subscriber is authorized to use AKMA based on the presence of the UE-specific $K_{AKMA}$ key 704 identified by the A-KID. Anchor function controller 1004 derives the $K_{AF}$ keys 708 (e.g., $K_{AF1}$, $K_{AF2}$, ..., $K_{AFN}$) for the AFs 222 based on the AF identities and the $K_{AKMA}$ key 704 (step 1404). As shown in FIG. 8, anchor function controller 1004 derives the $K_{AF}$ key 708 ($K_{AF1}$) for AF 222-1 based on the AF1_ID and the $K_{AKMA}$ key 704, derives the $K_{AF}$ key 708 ($K_{AF2}$) for AF 222-2 based on the AF2_ID and the $K_{AKMA}$ key 704, etc. Anchor function controller 1004 sends a key response message toward AKMA authentication proxy 602 that includes the $K_{AF}$ keys 708 (step 1406), such as through network interface component 1002. As shown in FIG. 12A, anchor function controller 1004 may send an Naanf_AKMA_ApplicationKey_Get Response message 1203 directly to AKMA authentication proxy 602 with the $K_{AF}$ keys 708 (e.g., $K_{AF1}$, $K_{AF2}$, ..., $K_{AFN}$) derived for the AFs 222, $K_{AF}$ expiration times, SUPI, and/or other information. As shown in FIG. 12B, anchor function controller 1004 may send a key response message toward the AKMA authentication proxy 602 via the NEF service API. Anchor function controller 1004 sends an Naanf_AKMA_ApplicationKey_Get Response message 1203 to NEF 224, and NEF 224 in turn sends an Nnef_AKMA_ApplicationKey_Get Response message 1207 to AKMA authentication proxy 602.

In FIG. 13, proxy controller 904 of AKMA authentication proxy 602 receives the key response message sent from AAnF 536 that includes the $K_{AF}$ keys 708 derived for the AFs 222 (step 1306), such as through network interface component 902. Proxy controller 904 stores the $K_{AF}$ keys 708 and the $K_{AF}$ expiration times provided by AAnF 536 in the key response message, such as in local storage (i.e., memory 932).

The Application Session Establishment Request message 1201 received from UE 106 requested an application session with AF 222-1. Thus, proxy controller 904 identifies the $K_{AF}$ key derived for AF 222-1 (step 1308), such as from local storage. Proxy controller 904 forwards or redirects the Application Session Establishment Request message 1201 to AF 222-1 (step 1310). Proxy controller 904 includes the $K_{AF}$ key 708 (e.g., $K_{AF1}$) derived for AF 222-1, the $K_{AF}$ expiration time, SUPI, and/or other information in the Application Session Establishment Request message 1201. As shown in FIG. 12A, in response to the Application Session Establishment Request message 1201 being forwarded by AKMA authentication proxy 602, AF 222-1 sends an Application Session Establishment Response message 1204 to UE 106.

Figure 15:
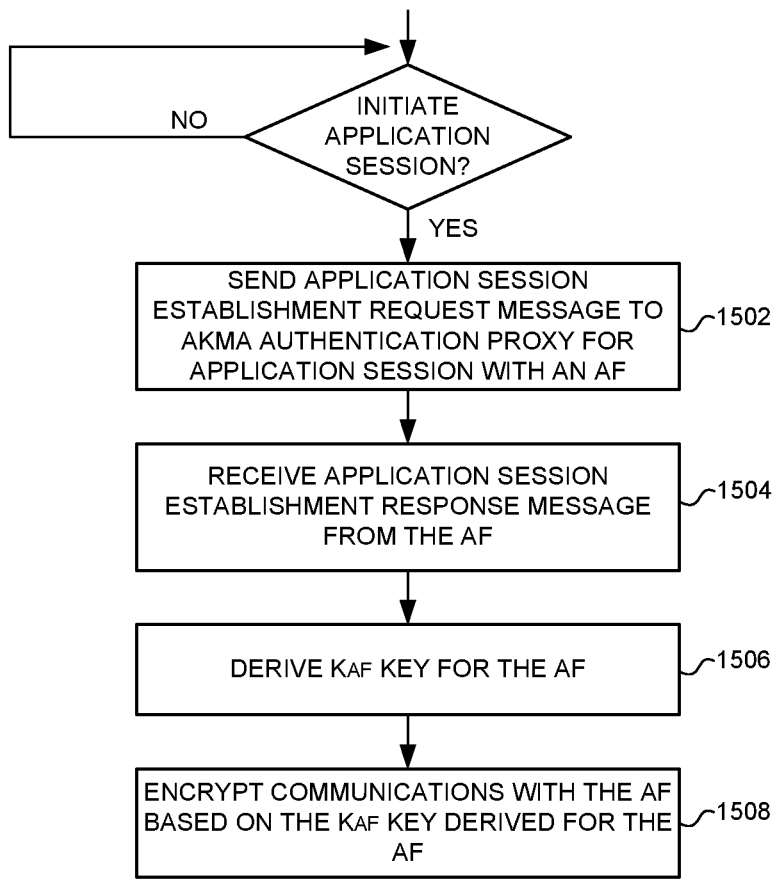
FIG. 15 is a flow chart illustrating a method of performing an AKMA authentication service in a UE in an illustrative embodiment.

FIG. 15 is a flow chart illustrating a method 1500 of performing an AKMA authentication service in a UE 106 in an illustrative embodiment. As described above, to initiate an application session with a first AF 222-1, UE 106 sends an Application Session Establishment Request message 1201 to AKMA authentication proxy 602 requesting an application session with AF 222-1 (step 1502), as shown in FIGS. 12A-12B. UE 106 receives the Application Session Establishment Response message 1204 from AF 222-1 (step 1504). UE 106 derives the $K_{AF}$ key 708 (referred to as $K_{AF1}$ key) for AF 222-1 based on the AF identity for AF 222-1 and the $K_{AKMA}$ key 704 (step 1506). AF 222-1 already has keying material received from AKMA authentication proxy 602, and UE 106 derives the keying material as in step 1506. UE 106 encrypts communications with AF 222-1 over the Ua* reference point based on the $K_{AF1}$ key it derived locally (step 1508). Likewise, AF 222-1 will encrypt communications with UE 106 over the Ua* reference point based on the $K_{AF1}$ key received from AKMA authentication proxy 602.

Figure 16A:
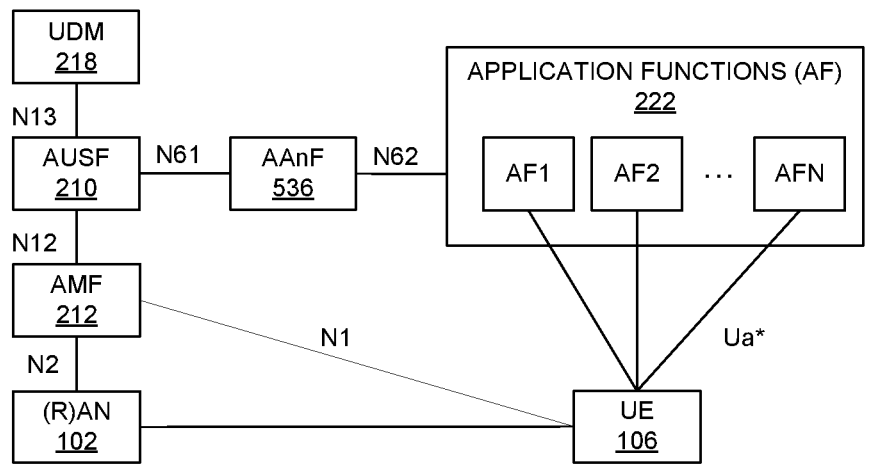
FIGS. 16A-16B illustrate AKMA architectures in illustrative embodiments.
Figure 16B:
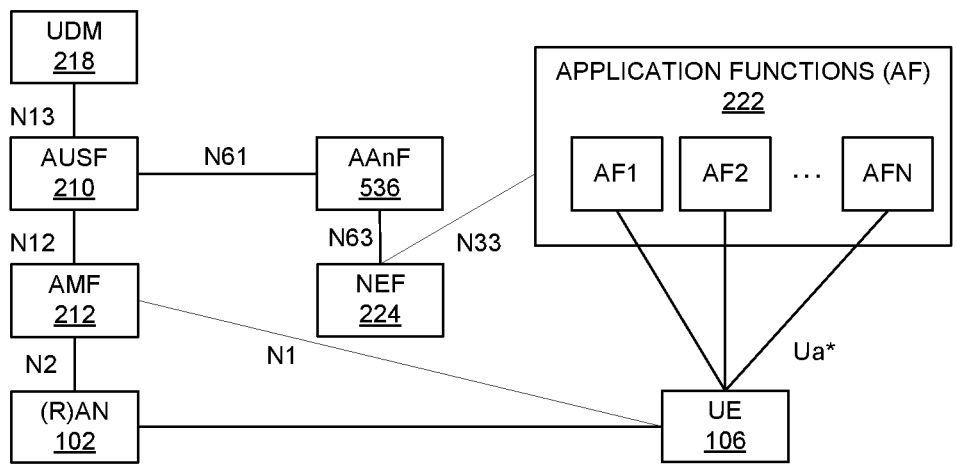

FIGS. 16A-16B illustrate AKMA architectures 1600-1601 in illustrative embodiments. FIG. 16A illustrates an AKMA architecture 1600 in reference point representation for internal AFs after AKMA authentication. FIG. 16B illustrates an AKMA architecture 1601 in reference point representation for external AFs after AKMA authentication. In AKMA architectures 1600-1601, UE 106 communicates with an AF(s) 222 over the Ua* reference point, and not through AKMA authentication proxy 602.

Figure 12C:
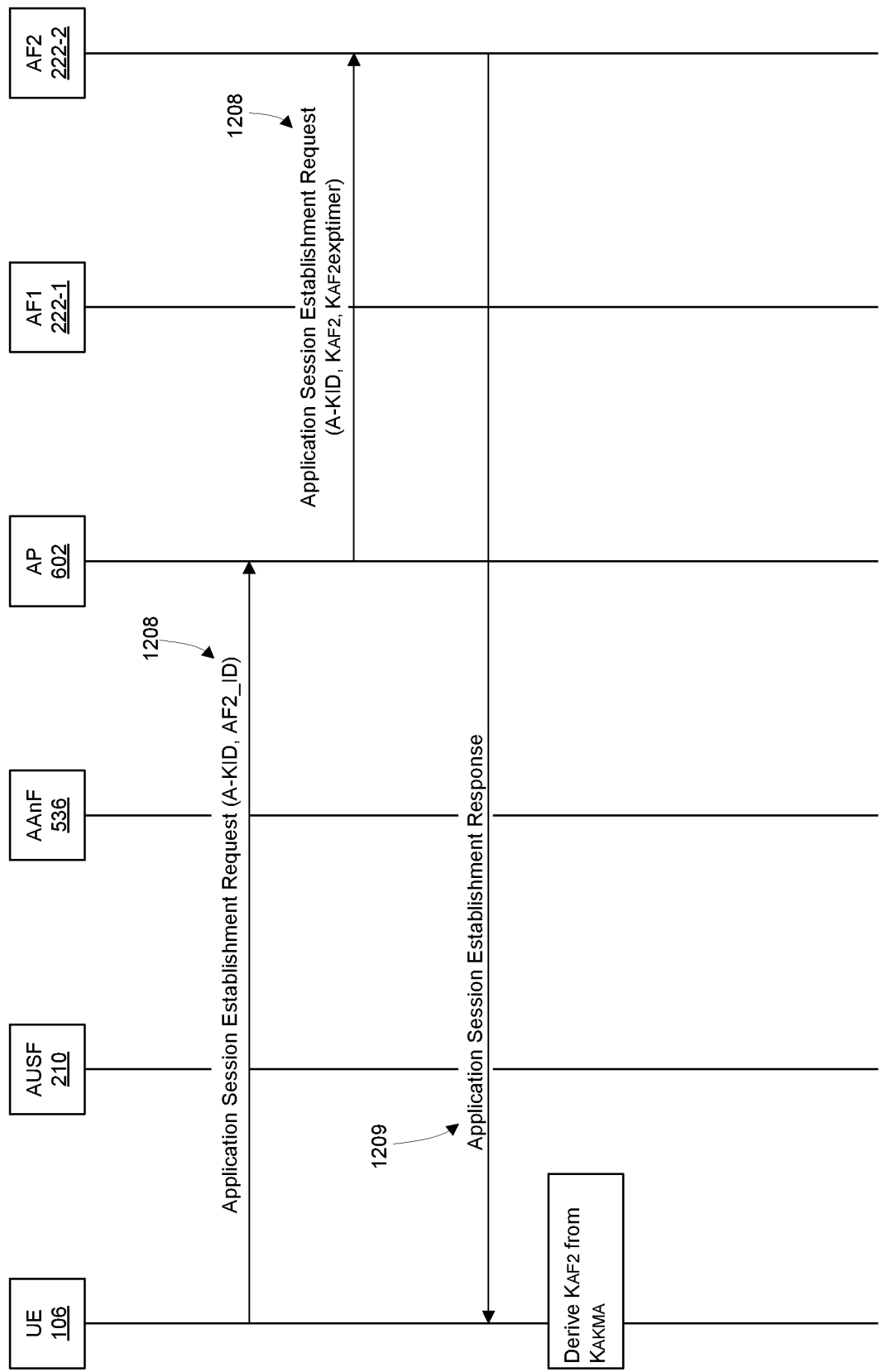

In FIG. 12C, assume in another embodiment that UE 106 wants to establish an application session with another AF 222-2, which may be referred to as a second AF 222-2. To establish the application session, UE 106 sends another Application Session Establishment Request message 1208 to AKMA authentication proxy 602. UE 106 includes the A-KID and the AF identity of AF 222-2 (e.g., AF2_ID) in the Application Session Establishment Request message 1208.

Figure 17:
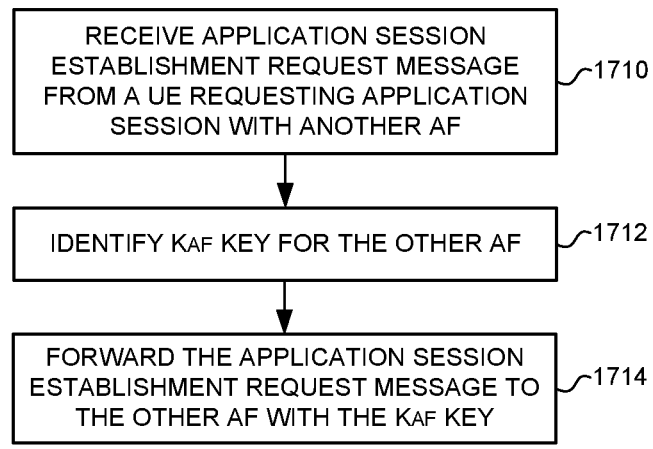
FIG. 17 is a flow chart illustrating another method of performing an AKMA authentication service in an AKMA authentication proxy in an illustrative embodiment.

FIG. 17 is a flow chart illustrating another method 1700 of performing an AKMA authentication service in an AKMA authentication proxy 602 in an illustrative embodiment. Proxy controller 904 of AKMA authentication proxy 602 receives the Application Session Establishment Request message 1208 from UE 106 (step 1710), such as through network interface component 902. The Application Session Establishment Request message 1208 from UE 106 may be referred to as a second or subsequent Application Session Establishment Request message. In response to the Application Session Establishment Request message 1208, proxy controller 904 determines whether a key derivation procedure has been performed for UE 106. For example, proxy controller 904 may determine whether or not it stores a $K_{AF}$ key mapped to the AF identity (e.g., AF2_ID) of AF 222-2. In this example, a key derivation procedure was already performed in response to the initial the Application Session Establishment Request message 1201. Thus, proxy controller 904 identifies the $K_{AF}$ key previously derived for AF 222-2 (step 1712), such as from local storage. Proxy controller 904 forwards or redirects the Application Session Establishment Request message 1208 to AF 222-2 (step 1714). Proxy controller 904 includes the $K_{AF}$ key 708 (e.g., $K_{AF2}$) derived for AF 222-2, the $K_{AF}$ expiration time, SUPI, and/or other information. As shown in FIG. 12C, in response to the Application Session Establishment Request message 1208 being forwarded by AKMA authentication proxy 602, AF 222-2 sends an Application Session Establishment Response message 1209 to UE 106.

In FIG. 15, to initiate the application session with the second AF 222-2, UE 106 sends another Application Session Establishment Request message 1208 to AKMA authentication proxy 602 requesting an application session with AF 222-2 (step 1502), as shown in FIG. 12C. UE 106 receives the Application Session Establishment Response message 1209 from AF 222-2 (step 1504). UE 106 derives the $K_{AF}$ key 708 (referred to as $K_{AF2}$ key) for AF 222-2 based on the AF identity for AF 222-2 and the $K_{AKMA}$ key 704 (step 1506). AF 222-2 already has keying material received from AKMA authentication proxy 602, and UE 106 derives the keying material as in step 1506. UE 106 encrypts communications with AF 222-2 over the Ua* reference point based on the $K_{AF2}$ key it derived locally (step 1508). Likewise, AF 222-2 will encrypt communications with UE 106 over the Ua* reference point based on the $K_{AF2}$ key received from AKMA authentication proxy 602.

UE 106 may repeat this process for other application sessions with other AFs 222.

One technical benefit of the procedure described above is AAnF 536 generates the $K_{AF}$ keys 708 for a group or batch of AFs 222 in response to a single request from AKMA authentication proxy 602. The number of AFs 222 in the group may vary as desired. For example, AKMA authentication proxy 602 may manage or support multiple AFs 222 of a service provider (e.g., Google, Apple, etc.). AKMA authentication proxy 602 may therefore request that AAnF 536 generate the $K_{AF}$ keys 708 concurrently for this group of AFs 222 in a single request, and distribute the $K_{AF}$ keys 708 to the individual AFs 222 as UE 106 requests application sessions.

Figure 12D:
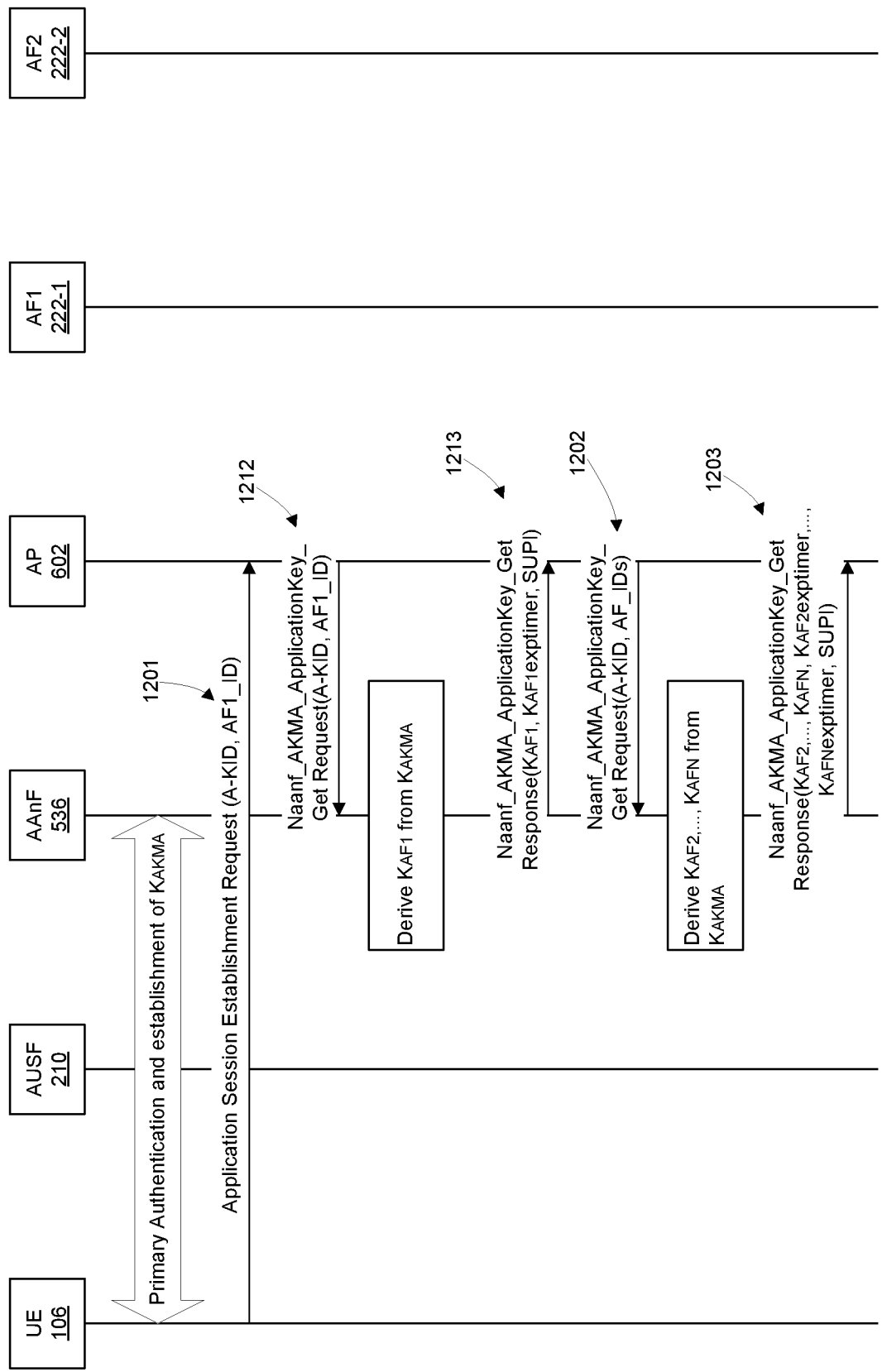

In one embodiment, AKMA authentication proxy 602 may request that AAnF 536 derive the $K_{AFN}$ keys 708 for the AFs 222 that are authorized for UE 106. In FIG. 12D, to establish an application session, UE 106 sends an Application Session Establishment Request message 1201 to AKMA authentication proxy 602. UE 106 includes the A-KID and the AF identity of AF 222-1 (e.g., AF1_ID) in the Application Session Establishment Request message 1201. As an overview, AKMA authentication proxy 602 will send an initial or "first" key request message toward AAnF 536 requesting a $K_{AF}$ key 708 for the first AF 222-1, and receive an initial key response message sent by AAnF 536 that includes the $K_{AF}$ key 708 and a UE identity for the UE 106. Based on the UE identity, AKMA authentication proxy 602 is able to identify the AFs 222 that are authorized for UE 106, and request the $K_{AF}$ keys 708 for the authorized AFs 222 in a subsequent or "second" key request message.

Figure 18:
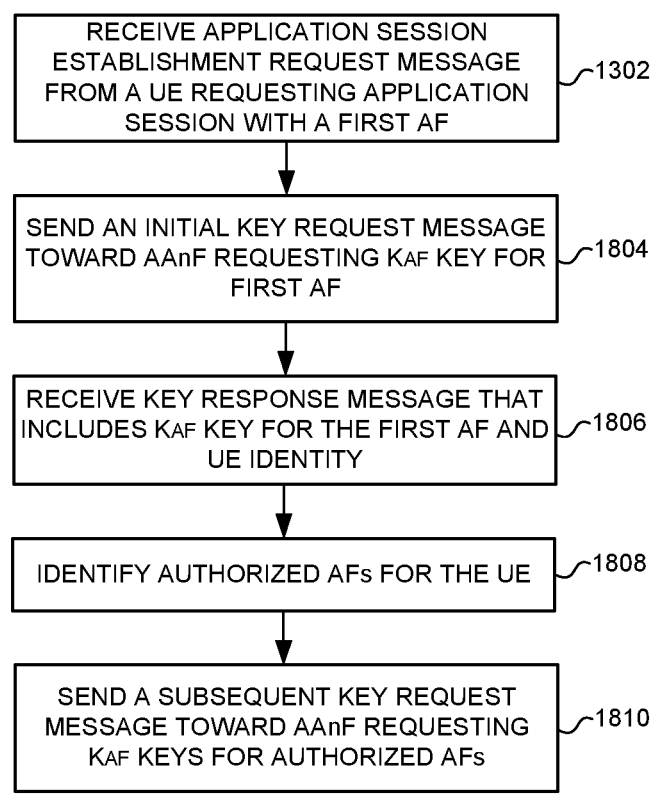
FIG. 18 is a flow chart illustrating another method of performing an AKMA authentication service in an AKMA authentication proxy in an illustrative embodiment.

FIG. 18 is a flow chart illustrating another method 1800 of performing an AKMA authentication service in an AKMA authentication proxy 602 in an illustrative embodiment. The steps of method 1800 that correspond with steps of method 1300 in FIG. 13 are shown with the same reference number. Proxy controller 904 of AKMA authentication proxy 602 receives the Application Session Establishment Request message 1201 from UE 106 (step 1302). In response to the Application Session Establishment Request message 1201, proxy controller 904 sends an initial key request message toward AAnF 536 requesting a $K_{AF}$ key 708 for the AF 222 indicated in the Application Session Establishment Request message 1201 (step 1804). The AF 222 indicated in the Application Session Establishment Request message 1201 may be referred to as a first AF 222-1 having an AF1_ID. Proxy controller 904 includes the A-KID and the AF identity (AF1_ID) of AF 222-1 in the initial key request message. As shown in FIG. 12D, proxy controller 904 may send a Naanf_AKMA_ApplicationKey_Get Request message 1212 directly to AAnF 536 with the A-KID and AF1_ID.

As in FIG. 14, anchor function controller 1004 of AAnF 536 receives the key request message from AKMA authentication proxy 602 or NEF 224 (step 1402). Anchor function controller 1004 derives the $K_{AF}$ key 708 (e.g., $K_{AF1}$) for AF 222-1 based on the AF identity (AF1_ID) and the $K_{AKMA}$ key 704 (step 1404). Anchor function controller 1004 sends a key response message toward AKMA authentication proxy 602 that includes the $K_{AF1}$ key 708 (step 1406). As shown in FIG. 12D, anchor function controller 1004 may send an Naanf_AKMA_ApplicationKey_Get Response message 1213 directly to AKMA authentication proxy 602 with the $K_{AF1}$ key 708 derived for the AF 222-1, $K_{AF1}$ expiration time, SUPI, and/or other information.

In FIG. 18, proxy controller 904 of AKMA authentication proxy 602 receives the key response message sent from AAnF 536 that includes the $K_{AF1}$ key 708 derived for AF 222-1 (step 1806). Proxy controller 904 stores the $K_{AF1}$ key 708 and the $K_{AF1}$ expiration time provided by AAnF 536 in the key response message, such as in local storage (i.e., memory 932). The key response message sent from AAnF 536 also includes a UE identity of UE 106 (e.g., SUPI). Thus, proxy controller 904 identifies a set or group (i.e., more than one) of AFs 222 that are authorized for UE 106 based on the UE identity (step 1808). Proxy controller 904 may then request the $K_{AF}$ keys 708 for the authorized AFs 222 as described in FIG. 13. More particularly, proxy controller 904 sends a subsequent key request message toward AAnF 536 requesting the $K_{AF}$ keys 708 for the authorized AFs 222 (step 1810). As shown in FIG. 12D, proxy controller 904 may send a Naanf_AKMA_ApplicationKey_Get Request message 1202 directly to AAnF 536 with the A-KID and the AF_IDs of the authorized AFs 222. Thus, the $K_{AF}$ keys 708 for the authorized AFs 222 are obtained as a group from AAnF 536, and are limited to the authorized AFs 222.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. An Authentication and Key Management for Applications (AKMA) authentication proxy (602), comprising:

at least one processor (930); and at least one memory (932) storing computer program code;

wherein the at least one processor is configured to execute the computer program code to cause the AKMA authentication proxy at least to:

receive an application session establishment request message (1201) from User Equipment (UE) (106) requesting an application session with a first application function (222);

send a key request message (1202) toward an AKMA anchor function (536) requesting AKMA application keys (708) for a plurality of application functions (222);

receive a key response message (1203) sent from the AKMA anchor function that includes the AKMA application keys;

identify a first AKMA application key for the first application function from the AKMA application keys derived by the AKMA anchor function; and forward the application session establishment request message to the first application function with the first AKMA application key.

2. The AKMA authentication proxy of claim 1, wherein:
the AKMA application keys are derived by the AKMA anchor function based on application function identities (802) of the application functions provided in the key request message, and an AKMA anchor key (704).

3. The AKMA authentication proxy of claim 1, wherein the at least one processor further causes the AKMA authentication proxy at least to:
receive a subsequent application session establishment request message (1208) from the UE requesting an application session with a second application function;
identify a second AKMA application key for the second application function from the AKMA application keys previously derived by the AKMA anchor function; and
forward the subsequent application session establishment request message to the second application function with the second AKMA application key.

4. The AKMA authentication proxy of claim 1, wherein the at least one processor further causes the AKMA authentication proxy at least to:
identify a set of the application functions that are authorized for the UE; and
send the key request message toward the AKMA anchor function requesting the AKMA application keys for the set of the application functions that are authorized for the UE.

5. The AKMA authentication proxy of claim 1, wherein the at least one processor further causes the AKMA authentication proxy at least to:
send an initial key request message (1212) toward the AKMA anchor function requesting the first AKMA application key for the first application function;
receive an initial key response message (1213) sent from the AKMA anchor function that includes the first AKMA application key for the first application function, and includes a UE identity of the UE; and
identify a set of the application functions that are authorized for the UE based on the UE identity
wherein sending the key request message (1202) toward the AKMA anchor function requesting the AKMA application keys for the plurality of application functions comprises sending a subsequent key request message toward the AKMA anchor function requesting the AKMA application keys for the authorized application functions.

6. A method of performing an Authentication and Key Management for Applications (AKMA) authentication service, the method comprising:
receiving (1302), in an AKMA authentication proxy, an application session establishment request message from User Equipment (UE) requesting an application session with a first application function;
sending (1304) a key request message from the AKMA authentication proxy toward an AKMA anchor function requesting AKMA application keys for a plurality of application functions;
receiving (1306), at the AKMA authentication proxy, a key response message sent from the AKMA anchor function that includes the AKMA application keys;
identifying (1308), at the AKMA authentication proxy, a first AKMA application key for the first application function from the AKMA application keys derived by the AKMA anchor function; and
forwarding (1310) the application session establishment request message from the AKMA authentication proxy to the first application function with the first AKMA application key.

7. The method of claim 6, further comprising:
deriving (1404), at the AKMA anchor function, the AKMA application keys based on application function identities of the application functions provided in the key request message, and an AKMA anchor key.

8. The method of claim 6, further comprising:
receiving (1504), at the UE, an application session establishment response message from the first application function; and
deriving (1506), at the UE, the first AKMA application key for the first application function based on an application function identity of the first application function, and an AKMA anchor key.

9. The method of claim 6, further comprising:
receiving (1710), at the AKMA authentication proxy, a subsequent application session establishment request message from the UE requesting an application session with a second application function;
identifying (1712), at the AKMA authentication proxy, a second AKMA application key for the second application function from the AKMA application keys previously derived by the AKMA anchor function; and
forwarding (1714) the subsequent application session establishment request message from the AKMA authentication proxy to the second application function with the second AKMA application key.

10. The method of claim 9, further comprising:
receiving (1504), at the UE, a subsequent application session establishment response message from the second application function; and
deriving (1506), at the UE, the second AKMA application key for the second application function based on an application function identity of the second application function, and an AKMA anchor key.

11. The method of claim 6, wherein sending the key request message from the AKMA authentication proxy toward the AKMA anchor function comprises:
sending the key request message from the AKMA authentication proxy toward the AKMA anchor function requesting the AKMA application keys for a set of the application functions that are authorized for the UE.

12. The method of claim 6, further comprising:
sending (1804) an initial key request message toward the AKMA anchor function requesting a first AKMA application key for the first application function;
receiving (1806) an initial key response message sent from the AKMA anchor function that includes the first AKMA application key for the first application function, and includes a UE identity of the UE; and
identifying (1808) a set of the application functions that are authorized for the UE based on the UE identity;
wherein sending the key request message from the AKMA authentication proxy toward the AKMA anchor function requesting the AKMA application keys for the plurality of application functions comprises sending (1810) a subsequent key request message toward the AKMA anchor function requesting the AKMA application keys for the authorized application functions.

13. A non-transitory computer readable medium embodying programmed instructions executed by a processor of an Authentication and Key Management for Applications (AKMA) authentication proxy, wherein the instructions, when executed by the processor, cause the AKMA authentication proxy at least to:
receive, in the AKMA authentication proxy, an application session establishment request message from User Equipment (UE) requesting an application session with a first application function;

send a key request message from the AKMA authentication proxy toward an AKMA anchor function requesting AKMA application keys for a plurality of application functions;

receive, at the AKMA authentication proxy, a key response message sent from the AKMA anchor function that includes the AKMA application keys;

identify, at the AKMA authentication proxy, a first AKMA application key for the first application function from the AKMA application keys derived by the AKMA anchor function; and forward the application session establishment request message from the AKMA authentication proxy to the first application function with the first AKMA application key.

14. The computer readable medium of claim 13, wherein: the AKMA application keys are derived by the AKMA anchor function based on application function identities of the application functions provided in the key request message, and an AKMA anchor key.

15. The computer readable medium of claim 13, wherein the instructions, when executed by the processor, further cause the AKMA authentication proxy at least to:

receive, at the AKMA authentication proxy, a subsequent application session establishment request message from the UE requesting an application session with a second application function;

identify, at the AKMA authentication proxy, a second AKMA application key for the second application function from the AKMA application keys previously derived by the AKMA anchor function; and forward the subsequent application session establishment request message from the AKMA authentication proxy to the second application function with the second AKMA application key.

16. The computer readable medium of claim 13, wherein sending the key request message from the AKMA authentication proxy toward the AKMA anchor function comprises:

sending the key request message from the AKMA authentication proxy toward the AKMA anchor function requesting the AKMA application keys for a set of the application functions that are authorized for the UE.

17. The computer readable medium of claim 13, wherein the instructions, when executed by the processor, further cause the AKMA authentication proxy at least to:

send an initial key request message toward the AKMA anchor function requesting a first AKMA application key for the first application function;

receive an initial key response message sent from the AKMA anchor function that includes the first AKMA application key for the first application function, and includes a UE identity of the UE; and identify a set of the application functions that are authorized for the UE based on the UE identity;

wherein sending the key request message from the AKMA authentication proxy toward the AKMA anchor function requesting the AKMA application keys for the plurality of application functions comprises sending a subsequent key request message toward the AKMA anchor function requesting the AKMA application keys for the authorized application functions.

* * * * *